United States Patent
Michitaka et al.

(10) Patent No.: US 12,018,121 B2
(45) Date of Patent: Jun. 25, 2024

(54) (POLY)ALKYLENE GLYCOL-CONTAINING COMPOUND

(71) Applicant: NIPPON SHOKUBAI CO., LTD., Osaka (JP)

(72) Inventors: Daisuke Michitaka, Osaka (JP); Ryusuke Kanao, Osaka (JP); Tsuyoshi Nishikawa, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 507 days.

(21) Appl. No.: 17/299,233

(22) PCT Filed: Dec. 5, 2019

(86) PCT No.: PCT/JP2019/047557
§ 371 (c)(1),
(2) Date: Jun. 2, 2021

(87) PCT Pub. No.: WO2020/116549
PCT Pub. Date: Jun. 11, 2020

(65) Prior Publication Data
US 2022/0073678 A1    Mar. 10, 2022

(30) Foreign Application Priority Data

| Dec. 5, 2018 | (JP) | 2018-228093 |
| Mar. 20, 2019 | (JP) | 2019-053023 |
| Jun. 3, 2019 | (JP) | 2019-103670 |
| Jul. 26, 2019 | (JP) | 2019-137866 |
| Oct. 1, 2019 | (JP) | 2019-181617 |

(51) Int. Cl.
*C08G 65/333* (2006.01)
*C08G 65/26* (2006.01)
*C11D 1/72* (2006.01)

(52) U.S. Cl.
CPC ..... *C08G 65/33317* (2013.01); *C08G 65/263* (2013.01); *C11D 1/72* (2013.01)

(58) Field of Classification Search
CPC ............ C08G 65/33317; C08G 65/263; C08G 65/2633; C08G 65/33327; C08G 65/33396; C11D 1/72; C11D 3/3707; C11D 3/3776
See application file for complete search history.

(56) References Cited

U.S. PATENT DOCUMENTS

| 4,801,400 A * | 1/1989 | Login ................. C07D 207/27 504/362 |
| 4,842,858 A | 6/1989 | Tracy et al. |
| 4,904,408 A | 2/1990 | Kud et al. |
| 5,352,251 A | 10/1994 | Lin et al. |
| 5,507,843 A | 4/1996 | Lin et al. |
| 2004/0266655 A1 | 12/2004 | Baum et al. |

FOREIGN PATENT DOCUMENTS

| EP | 3 753 968 | 12/2020 |
| JP | 63-260995 | 10/1988 |
| JP | 1-502435 | 8/1989 |
| JP | 8-508054 | 8/1996 |
| JP | 2005-509065 | 4/2005 |
| JP | 2009-084335 | 4/2009 |
| JP | 2012-149186 | 8/2012 |
| JP | 2012149186 A * | 8/2012 |
| WO | 88/06586 | 9/1988 |
| WO | 94/22984 | 10/1994 |
| WO | 2018/005731 | 1/2018 |

* cited by examiner

*Primary Examiner* — K. Boyle
(74) *Attorney, Agent, or Firm* — HSML P.C.

(57) ABSTRACT

The present invention provides a (poly)alkylene glycol-containing compound having higher detergency for composite stains of hydrophilic stains and hydrophobic stains than conventional (poly)alkylene glycol-containing compounds. The present invention relates to a (poly)alkylene glycol-containing compound including: a hydrophobic structural moiety (A); a (poly)alkylene glycol moiety (B); and one lactam ring-containing structural unit (C), in its structure, the hydrophobic structural moiety (A) being present in a proportion of 2.5 to 60% by mass in 100% by mass of the (poly)alkylene glycol-containing compound.

16 Claims, No Drawings

(POLY)ALKYLENE GLYCOL-CONTAINING COMPOUND

TECHNICAL FIELD

The present invention relates to (poly)alkylene glycol-containing compounds. Specifically, the present invention relates to a (poly)alkylene glycol-containing compound useful for detergents, for example.

BACKGROUND ART (Poly)alkylene glycol chain-containing compounds with appropriately adjusted chain lengths and alkylene oxides that constitute the compounds have properties such as hydrophilicity, hydrophobicity, flexibility, and steric repulsion. Such compounds are used in various applications such as detergent builders, detergents, chemicals for water treatment, scale inhibitors, and dispersants.

For example, Patent Literature 1 discloses a polyalkylene glycol represented by a specific structure used as a scale inhibitor, a detergent composition, or a dispersant for pigments.

Patent Literature 2 discloses a lactam-functionalized polymer including a polymer backbone selected from the group consisting of polyacetal polyether, polyhemiaminal polyether, polyaminal polyether, and combinations thereof and at least one lactam-containing moiety attached to the polymer backbone, and the lactam-functionalized polymer is used in a coating application.

Patent Literature 3 discloses a nonionic surfactant including a specific compound containing pyrrolidone units.

CITATION LIST

Patent Literature
Patent Literature 1: JP 2012-149186 A
Patent Literature 2: WO 2018/005731
Patent Literature 3: U.S. Pat. No. 4,801,400

SUMMARY OF INVENTION

Technical Problem

Although compounds having a (poly)alkylene glycol structure have been disclosed in Patent Literatures 1 to 3 as described above, conventional (poly)alkylene glycol-containing compounds still are required to be improved in terms of detergency for composite stains of hydrophilic stains and hydrophobic stains.

The present invention has been made in view of such a current state of the art and aims to provide a (poly)alkylene glycol-containing compound having higher detergency for composite stains of hydrophilic stains and hydrophobic stains than conventional (poly)alkylene glycol-containing compounds.

Solution to Problem

The present inventors have conducted various studies on (poly)alkylene glycol-containing compounds and found that a (poly)alkylene glycol-containing compound including a hydrophobic structural moiety, a (poly)alkylene glycol moiety, and one lactam ring-containing structural unit, in its structure, with the hydrophobic structural moiety being present in a proportion within a specific range, has higher detergency for composite stains of hydrophilic stains and hydrophobic stains than conventional (poly)alkylene glycol-containing compounds. Thereby, the inventors have arrived at the solution to the above problem, completing the present invention.

That is, the present invention relates to a (poly)alkylene glycol-containing compound including:
a hydrophobic structural moiety (A);
a (poly)alkylene glycol moiety (B); and
one lactam ring-containing structural unit (C), in its structure,
the hydrophobic structural moiety (A) being present in a proportion of 2.5 to 60% by mass in 100% by mass of the (poly)alkylene glycol-containing compound.

Preferably, the lactam ring is a pyrrolidone ring.

Preferably, the (poly)alkylene glycol-containing compound contains the hydrophobic structural moiety (A), the lactam ring-containing structural unit (C), and the (poly)alkylene glycol moiety (B) in the stated order.

Preferably, the (poly)alkylene glycol-containing compound contains the hydrophobic structural moiety (A), the (poly)alkylene glycol moiety (B), and the lactam ring-containing structural unit (C) in the stated order.

Preferably, the (poly)alkylene glycol-containing compound contains hydrophobic groups at an end of a (poly)alkylene glycol chain and an end other than the end of a (poly)alkylene glycol chain.

Preferably, the (poly)alkylene glycol-containing compound is represented by the following formula (1) or (2):

[Chem. 1]

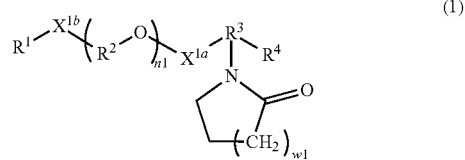

(1)

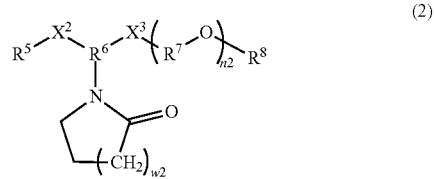

(2)

wherein in the formula (1), $R^1$ and $R^4$ are the same as or different from each other and are each a hydrogen atom or hydrophobic group, at least one of $R^1$ or $R^4$ being a hydrophobic group; $R^2$s are the same as or different from each other and are each a C2-C20 alkylene group; $R^3$ is a C2-C10 trivalent hydrocarbon group optionally containing a heteroatom; $X^{1a}$ and $X^{1b}$ are the same as or different from each other and are each a direct bond or a divalent linking group; n1 is a number of 1 to 100; and w1 is a number of 1 to 3, and wherein in the formula (2), $R^5$ is a hydrocarbon group having a carbon number of 4 or greater and optionally containing a heteroatom; $R^8$ is a hydrogen atom or a hydrocarbon group having a carbon number smaller than that of $R^5$ and optionally containing a heteroatom; $R^6$ is a C2-C50 trivalent hydrocarbon group optionally containing a heteroatom; $R^7$s are the same as or different from each other and are each a C2-C20 alkylene group; $X^2$ and $X^3$ are the same as or different from each other and are each a direct bond or a divalent linking group; n2 is a number of 1 to 100; and w2 is a number of 1 to 3.

Preferably, $R^3$ in the formula (1) and $R^6$ in the formula (2) are the same as or different from each other and $R^3$ and $R^6$ are each a structure represented by the following formula (3) or (3');

[Chem. 2]

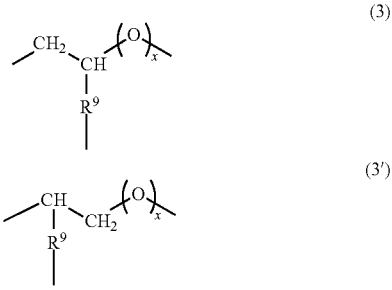

wherein x is 0 or 1 and $R^9$ is a direct bond or a C1-C8 alkylene group optionally containing an ether structure.

Preferably, $R^3$ in the formula (1) and $R^6$ in the formula (2) are the same as or different from each other and $R^3$ and $R^6$ are each a structure represented by the following formula (4) or (4');

[Chem. 3]

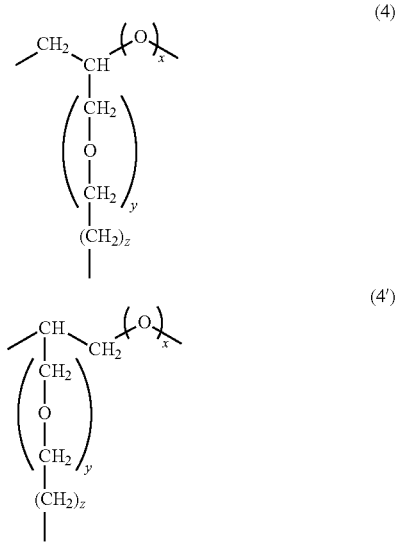

wherein x and y are the same as or different from each other and are each 0 or 1 and z is a number of 0 to 5.

Preferably, the hydrophobic structural moiety (A) is a structure derived from at least one selected from the group consisting of an acyclic hydrocarbon compound, a cyclic saturated hydrocarbon compound, and an aromatic compound each optionally containing a heteroatom.

Preferably, $R^1$ is at least one selected from the group consisting of a C1-C50 aliphatic alkyl group, a C1-C50 alicyclic alkyl group, a C2-C50 alkenyl group, a C2-C50 alkynyl group, and a C6-C50 aryl group each optionally containing a heteroatom.

Preferably, $R^1$ is at least one selected from the group consisting of a C4-C50 aliphatic alkyl group, a C1-C50 alicyclic alkyl group, and a C6-C50 aryl group each optionally containing a heteroatom.

Preferably, $R^1$ is a C1-C50 aliphatic alkyl group optionally containing a heteroatom.

Preferably, $R^1$ is a C6-C50 aryl group optionally containing a heteroatom.

Preferably, the aliphatic alkyl group for $R^1$ has a carbon number of 4 to 30.

Preferably, the aryl group for $R^1$ has a carbon number of 6 to 30.

Preferably, $R^5$ is at least one selected from the group consisting of a C4-C50 aliphatic alkyl group, a C4-C50 alicyclic alkyl group, a C4-C50 alkenyl group, a C4-C50 alkynyl group, and a C6-C50 aryl group each optionally containing a heteroatom.

Preferably, $R^5$ is at least one selected from the group consisting of a C4-C50 aliphatic alkyl group, a C4-C50 alicyclic alkyl group, and a C6-C50 aryl group each optionally containing a heteroatom.

Preferably, $R^5$ is a C4-C50 aliphatic alkyl group optionally containing a heteroatom.

Preferably, $R^5$ is a C6-C50 aryl group optionally containing a heteroatom.

Preferably, the aliphatic alkyl group for $R^5$ has a carbon number of 4 to 30.

Preferably, the aryl group for $R^5$ has a carbon number of 6 to 30.

Preferably, $X^{1a}$ is a direct bond or at least one selected from the group consisting of a urethane group, an ester group, an ether group, a carbonyl group, a carbonate group, a sulfur-containing divalent organic group, an isocyanate group, and an amide group.

Preferably, $X^{1a}$ is a direct bond or an ether group.

Preferably, $X^{1b}$ is a direct bond or at least one selected from the group consisting of a urethane group, an ester group, an ether group, a carbonyl group, a carbonate group, a sulfur-containing divalent organic group, an isocyanate group, and an amide group.

Preferably, $X^{1b}$ is a direct bond or an ether group.

Preferably, $X^2$ is a direct bond or at least one selected from the group consisting of a urethane group, an ester group, an ether group, a carbonyl group, a carbonate group, a sulfur-containing divalent organic group, an isocyanate group, and an amide group.

Preferably, $X^2$ is a direct bond, an ester group, an amide group, or an ether group.

Preferably, $X^2$ is a direct bond, an ester group, or an ether group.

Preferably, $X^3$ is a direct bond or at least one selected from the group consisting of a urethane group, an ester group, an ether group, a carbonyl group, a carbonate group, a sulfur-containing divalent organic group, an isocyanate group, and an amide group.

Preferably, $X^3$ is a direct bond or an ether group.

Preferably, $R^4$ is a C1-C3 alkyl group or a hydrogen atom.

Preferably, $R^4$ is a methyl group or a hydrogen atom.

Preferably, $R^8$ is a C1-C3 alkyl group or a hydrogen atom.

Preferably, $R^8$ is a methyl group or a hydrogen atom.

Preferably, n1 is 5 to 80.

Preferably, n2 is 5 to 80.

Preferably, the lactam ring is present in a proportion of 1 to 50% by mass in 100% by mass of the (poly)alkylene glycol-containing compound.

Preferably, the (poly)alkylene glycol moiety (B) is present in a proportion of 5 to 95% by mass in 100% by mass of the (poly)alkylene glycol-containing compound.

Preferably, the (poly)alkylene glycol-containing compound has a number average molecular weight of 500 to 100000.

The present invention also relates to a method of producing the (poly)alkylene glycol-containing compound, the method including any one of the following steps (i) to (iii):
- a step (i) of reacting a lactam-containing compound with a compound containing a hydrophobic group at one end of a (poly)alkylene glycol;
- a step (ii) including a first step of reacting a lactam-containing compound with a (poly)alkylene glycol free from a substituent having a carbon number not smaller than that of the hydrophobic structural moiety (A) and a second step of reacting the resulting reaction product with a hydrophobic group-containing compound; and
- a step (iii) including a first step of reacting a hydrophobic group-containing compound with a lactam-containing compound and a second step of reacting the reaction product obtained in the first step with an alkylene oxide.

The present invention also relates to a composition including:
the (poly)alkylene glycol-containing compound; and
a different component other than the compound,
the (poly)alkylene glycol-containing compound being present in a proportion of 1 to 99% by mass in 100% by mass of the composition.

The present invention also relates to a detergent composition including:
the (poly)alkylene glycol-containing compound; and
a detergent additive other than the compound.

The present invention also relates to a detergent composition including:
the (poly)alkylene glycol-containing compound; and
a surfactant.

Advantageous Effects of Invention

The (poly)alkylene glycol-containing compound of the present invention has higher detergency for composite stains of hydrophilic stains and hydrophobic stains than conventional (poly)alkylene glycol-containing compounds and is thus suitable for detergents and the like.

DESCRIPTION OF EMBODIMENTS

The following description is offered to specifically illustrate preferred embodiments of the present invention. It should be noted that the present invention is not limited only to these embodiments, and the embodiments can be appropriately altered within the scope of the present invention. Any combination of two or more of the following preferred embodiments of the present invention is also a preferred embodiment of the present invention.

The (poly)alkylene glycol-containing compound (hereinafter, also referred to as a PAG compound) of the present invention includes a hydrophobic structural moiety (A), a (poly)alkylene glycol moiety (B), and one lactam ring-containing structural unit (C), in its structure.

The PAG compound of the present invention containing the hydrophilic (poly)alkylene glycol moiety (B), a lactam ring which interacts with carboxyl groups or ester groups in stains such as sebum, and a hydrophobic structural moiety has highly balanced hydrophobicity and hydrophilicity and strongly interacts with composite stains of hydrophilic stains and hydrophobic stains. Thus, the PAG compound has improved detergency for composite stains. Also, the PAG compound of the present invention having the above structure has an excellent ability to prevent redeposition of composite stains.

In the PAG compound of the present invention, as long as it has such a structure, the hydrophobic structural moiety (A), the (poly)alkylene glycol moiety (B), and the lactam ring-containing structural unit (C) may be attached to each other through any site, and the structural moieties (A), (B), and (C) may be present in the stated order (referred to as an embodiment (1)) or the structural moieties (A), (C), and (B) may be present in the stated order (referred to as an embodiment (2)). The embodiment (2) is preferred. In the case of the embodiment (2), the wettability gradient where wettability gradually varies from hydrophobic to hydrophilic is created in the compound, and the interfacial tension between washing water and hydrophobic components in composite stains is effectively reduced. This presumably achieves much better detergency for composite stains. The mechanism of the present invention is not limited thereto.

The PAG compound of the present invention can have detergency for composite stains under usual conditions described in the EXAMPLES below and also have excellent detergency under short-time conditions (e.g., the short-time conditions described in the EXAMPLES below).

The PAG compound may contain two or more structural moieties (A) and/or two or more structural moieties (B), for example, as long as the compound contains the structural moieties (A), (B), and (C).

In the PAG compound, the hydrophobic structural moiety (A) is present in a proportion of 2.5 to 60% by mass in 100% by mass of the (poly)alkylene glycol-containing compound. Such a PAG compound has more suitable hydrophobicity and strongly interacts with stains such as sebum. The proportion of the hydrophobic structural moiety (A) is more preferably 3 to 50% by mass, still more preferably 4 to 40% by mass, particularly preferably 5 to 30% by mass, further preferably 5 to 25% by mass, particularly further preferably 6 to 20% by mass, most preferably 8 to 15% by mass.

Herein, the structural moiety (A) refers to a structure derived from a material used to introduce a hydrophobic structural moiety into the PAG compound. For example, when the below-described hydrophobic group-containing compound is used to produce the PAG compound, the structural moiety (A) corresponds to a structure derived from the hydrophobic group-containing compound.

In the PAG compound, the (poly)alkylene glycol moiety (B) is preferably present in a proportion of 3 to 96.5% by mass in 100% by mass of the (poly)alkylene glycol-containing compound. The proportion is more preferably 5 to 95% by mass, still more preferably 10 to 93% by mass, further preferably 12 to 91% by mass, further more preferably 15 to 90, still further more preferably 20 to 88% by mass, particularly preferably 30 to 85% by mass, particularly further preferably 40 to 83% by mass, most preferably 50 to 80% by mass.

Herein, the moiety (B) refers to a structure derived from a material used to introduce a (poly)alkylene glycol into the PAG compound. For example, when the below-described alkylene oxide or (poly)alkylene glycol (a) is used to produce the PAG compound, the moiety (B) corresponds to a structure derived from either of these compounds.

In the PAG compound, the lactam ring-containing structural unit (C) is preferably present in a proportion of 1 to 80% by mass in 100% by mass of the (poly)alkylene glycol-containing compound. The proportion is more preferably 1.5 to 70% by mass, 1.8 to 65% by mass, still more preferably 2.0 to 60% by mass, further preferably 2.2 to 50% by mass, further more preferably 2.4 to 40% by mass, still further more preferably 2.5 to 35% by mass, particularly preferably 2.6 to 30% by mass, particularly further preferably 2.8 to 28% by mass, most preferably 3 to 25% by mass.

Herein, the structural moiety (C) refers to a structure derived from a material used to introduce a lactam ring-containing structural unit into the PAG compound. For example, when the below-described lactam-containing compound is used to produce the PAG compound, the structural moiety (C) corresponds to a structure derived from the lactam-containing compound.

In the PAG compound, the lactam ring is preferably present in a proportion of 1 to 50% by mass in 100% by mass of the (poly)alkylene glycol-containing compound. The proportion is more preferably 1.5 to 40% by mass, still more preferably 2 to 30% by mass, particularly preferably 2.5 to 20% by mass, particularly further preferably 3 to 18% by mass, most preferably 4 to 15% by mass.

The ratios of the structural moieties (A), (B), and (C) in the PAG compound are preferably as follows: the ratio of the structural moiety (C) is preferably 20 to 12000% by mass, more preferably 30 to 6000% by mass, still more preferably 40 to 3000% by mass, further preferably 40 to 2000% by mass, still further more preferably 45 to 800% by mass, particularly preferably 50 to 350% by mass, particularly further preferably 60 to 200% by mass, most preferably 70 to 151% by mass relative to 100% by mass of the structural moiety (A); the ratio of the moiety (B) is preferably 10 to 3000% by mass, more preferably 50 to 2500% by mass, still more preferably 100 to 2000% by mass, further preferably 150 to 1800% by mass, particularly preferably 200 to 1600% by mass, most particularly preferably 350 to 1500% by mass relative to 100% by mass of the structural moiety (A); and also, the ratio of the moiety (B) is preferably 5 to 6000% by mass, more preferably 50 to 5000% by mass, still more preferably 100 to 4000% by mass, further preferably 150 to 3500% by mass, further more preferably 200 to 3200% by mass, still further more preferably 200 to 2000% by mass, particularly preferably 200 to 1000% by mass, most preferably 200 to 900% by mass relative to 100% by mass of the structural moiety (C).

The PAG compound may contain a different structure (E) other than the structural moiety (A), moiety (B), and structural moiety (C). The different structure (E) is preferably present in a proportion of 0 to 50% by mass in 100% by mass of the (poly)alkylene glycol-containing compound. The proportion is more preferably 0 to 40% by mass, still more preferably 0 to 30% by mass, particularly preferably 0 to 20% by mass, most preferably 0 to 10% by mass.

The PAG compound may have any number average molecular weight, and the number average molecular weight is preferably 500 to 100000. Such a PAG compound has much better detergency for composite stains. The weight average molecular weight is more preferably 600 to 50000, still more preferably 800 to 10000, particularly preferably 1000 to 5000. The number average molecular weight of the PAG compound can be calculated based on the molecular weight and number of each of the structural units of the PAG compound.

<Hydrophobic Structural Moiety (A)>

The hydrophobic structural moiety (A) in the PAG compound is preferably a structure derived from a hydrophobic organic compound. The structural moiety derived from a hydrophobic organic compound means a structure obtained by abstracting one or two or more hydrogen atoms from the organic compound.

The organic compound preferably has an insoluble content of 9.5 g or more when 10 g of the organic compound is dissolved in 100 g of water at 25° C.

The organic compound is preferably a C1-C50 hydrocarbon compound optionally containing a heteroatom. The hydrocarbon compound preferably has a carbon number of 3 to 30, more preferably 4 to 21, still more preferably 8 to 18, particularly preferably 12 to 14.

Examples of the hydrocarbon compound include an acyclic hydrocarbon compound, a cyclic saturated hydrocarbon compound, a heterocyclic compound, and an aromatic compound. The hydrocarbon compound may optionally contain a heteroatom such as a nitrogen, sulfur, oxygen, phosphorus, or halogen atom as long as the hydrophobic structural moiety (A) in the PAG compound is hydrophobic. The hydrocarbon compound may optionally contain a substituent such as a hydroxy, alkoxy, carboxyl, acyl, sulfonate, amino, or phosphate group.

Examples of the acyclic hydrocarbon compound include a C1-C50 alkane, an alkene, and an alkyne.

Examples of the C1-C50 alkane include linear or branched alkanes such as methane, ethane, propane, butane, pentane, hexane, heptane, octane, nonane, decane, undecane, dodecane, tridecane, tetradecane, pentadecane, hexadecane, heptadecane, octadecane, nonadecane, icosane, henicosane, tetracosane, triacontane, tetracontane, and pentacontane.

Examples of the C2-C50 alkene include linear or branched alkenes such as ethylene, propene, butene, pentene, hexene, heptene, octene, nonene, decene, undecene, dodecene, tridecene, tetradecene, pentadecene, hexadecene, heptadecene, octadecene, nonadecene, icosene, henicosene, tetracosene, triacontene, tetracontene, pentacontene, and cis-3-octene.

Examples of the C2-C50 alkyne include linear or branched alkynes such as acetylene, propyne, butyne, pentyne, hexyne, heptyne, octyne, nonyne, decyne, undecyne, dodecyne, tridecyne, tetradecyne, pentadecyne, hexadecyne, heptadecyne, octadecyne, nonadecyne, icosyne, henicosyne, tetracosyne, triacontyne, tetracontyne, and pentacontyne.

Examples of the C3-C50 cyclic saturated hydrocarbon compound include cyclopropane, cyclobutane, cyclopentane, cyclohexane, cycloheptane, cyclooctane, and a compound in which at least one of an alkyl group or alkenyl group is attached to any of these compounds.

Examples of the C1-C50 heterocyclic compound include thiophene, furan, pyrrole, benzothiophene, benzofuran, indole, dibenzothiophene, dibenzofuran, carbazole, thiazole, benzothiazole, oxazole, benzoxazole, imidazole, pyrazole, benzimidazole, pyridine, pyrimidine, pyrazine, pyridazine, quinoline, isoquinoline, quinoxaline, benzothiadiazole, phenanthridine, oxadiazole, thiadiazole, and a compound in which at least one of an alkyl group or alkenyl group is attached to a heterocyclic ring of any of these compounds.

Examples of the C6-C50 aromatic compound include benzene, naphthalene, anthracene, phenanthrene, biphenyl, terphenyl, toluene, o-xylene, m-xylene, p-xylene, o-t-butyltoluene, m-t-butyltoluene, p-t-butyltoluene, 1-ethyl-4-methylbenzene, 1-ethyl-3-methylbenzene, 1-isopropyl-4-methylbenzene, 1-t-butyl-4-methylbenzene, mesitylene, pseudocumene, durene, methylnaphthalene, dimethylnaphthalene, 1,2,3,4-tetrahydronaphthalene, methylanthracene, 4,4'-dimethylbiphenyl, ethylbenzene, propylbenzene, butylbenzene, 1,4-diethylbenzene, styrene, distyrenated phenyl, quaterphenyl, quinquephenyl, sexiphenyl, septiphenyl, octiphenyl, and a compound containing an aromatic ring that contains at least one of an alkyl group or alkenyl group.

The hydrophobic structural moiety (A) may be present at any position in the PAG compound of the present invention. It is preferably present at an end of the PAG compound. In other words, the PAG compound is preferably a compound terminated with a hydrophobic group. More preferably, the PAG compound contains hydrophobic groups at an end of a (poly)alkylene glycol chain and an end other than the end of the (poly)alkylene glycol chain. In a preferred embodiment of the present invention, the (poly)alkylene glycol-containing compound contains hydrophobic groups at an end of a (poly)alkylene glycol chain and an end other than the end of the (poly)alkylene glycol chain.

The hydrophobic group is preferably an organic group derived from a hydrophobic organic compound.

Preferred examples of the organic group include a group derived from the hydrocarbon compound which may optionally contain any of the above-described heteroatoms or substituents and the below-described hydrocarbon group which may optionally contain any of the heteroatoms or substituents.

<(Poly)Alkylene Glycol Moiety (B)>

The PAG compound includes the (poly)alkylene glycol moiety (B). The carbon numbers of the alkylene groups of the moiety (B) are preferably the same as or different from each other and are each 2 to 20.

The expression 'the carbon numbers of the alkylene groups "are preferably the same as or different from each other" and are each 2 to 20' means that when the (poly) alkylene glycol contains multiple alkylene groups, all the carbon numbers of the alkylene groups may be the same as or different from each other.

The PAG compound may contain the moiety (B) at any position. The moiety (B) is preferably present at an end of the PAG compound. More preferably, a (poly)alkylene glycol chain is present at an end of the compound.

The (poly)alkylene glycol moiety (B) may contain at its end a hydrocarbon group optionally containing a heteroatom, and the carbon number of the hydrocarbon group is preferably smaller than that of the hydrophobic structural moiety (A).

The (poly)alkylene glycol moiety (B) in the PAG compound is preferably a structure represented by the following formula (5-1) or (5-2):

(5-1)

(5-2)

wherein $R^2$ and $R^7$ are the same as or different from each other and are each a C2-C20 alkylene group; n1 and n2 are the same as or different from each other and are each a number of 1 to 100; and $R^{8'}$ is a hydrogen atom or a substituent having a carbon number smaller than that of the hydrophobic structural moiety (A).

The expression '$R^2$ and $R^7$ are "the same as or different from each other" and are each a C2-C20 alkylene group' means that all n1 alkylene groups for $R^2$ and n2 alkylene groups for $R^7$ in the (poly)alkylene glycol may be the same as or different from each other.

The oxyalkylene groups represented by $R^2O$ and $R^7O$ are each an alkylene oxide adduct. Examples of the alkylene oxide include a C2-C8 alkylene oxide such as ethylene oxide, propylene oxide, butylene oxide, isobutylene oxide, 1-butene oxide, 2-butene oxide, or styrene oxide. Preferred is a C2-C4 alkylene oxide such as ethylene oxide, propylene oxide, or butylene oxide, with ethylene oxide or propylene oxide being more preferred.

When the polyalkylene glycol is an adduct with two or more alkylene oxides selected from alkylene oxides such as ethylene oxide, propylene oxide, butylene oxide, and styrene oxide, the alkylene oxides may be added by any addition form such as random addition, block addition, or alternating addition. To balance hydrophilicity and hydrophobicity, the oxyalkylene groups in the (poly)alkylene glycol preferably essentially include oxyethylene groups. More preferably, the oxyethylene groups constitute 50 mol % or more of the oxyalkylene groups, still more preferably constitute 90 mol % or more of the oxyalkylene groups.

$R^{8'}$ in the formula (5-2) is a hydrogen atom or a substituent having a carbon number smaller than that of the hydrophobic structural moiety (A). The substituent for $R^{8'}$ may be any one having a carbon number smaller than that of the hydrophobic structural moiety (A), preferably a hydrocarbon group optionally containing a heteroatom, more preferably a C1-C3 alkyl group such as a methyl, ethyl, or propyl group. $R^{8'}$ is preferably a methyl group or hydrogen atom, more preferably a hydrogen atom.

n1 in the formula (5-1) and n2 in the formula (5-2) are each the average number of moles of oxyalkylene groups added and are each a number of 1 to 100. n1 is preferably 2 to 90, more preferably 3 to 85, still more preferably 4 to 80, further preferably 5 to 75, particularly preferably 6 to 70, further more preferably 7 to 65, still further more preferably 8 to 60, most preferably 9 to 40.

<Lactam Ring-Containing Structural Unit (C)>

The lactam ring-containing structural unit (C) in the PAG compound may be any structural unit containing a lactam ring and is preferably a structural unit represented by the following formula (6):

[Chem. 4]

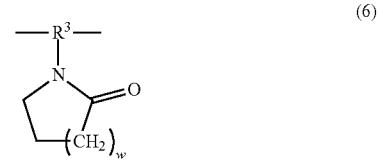

(6)

wherein $R^3$ is the same as or different from each other and is a C2-C10 trivalent hydrocarbon group optionally containing a heteroatom and w is a number of 1 to 3. w is a number of 1 to 3, preferably 1 or 2, more preferably 1.

In a preferred embodiment of the present invention, the lactam ring in the PAG compound of the present invention is a pyrrolidone ring.

The hydrocarbon group preferably has a carbon number of 2 to 7, more preferably 2 to 5.

$R^3$ in the formula (6) is preferably a structure represented by the following formula (3) or (3');

[Chem. 5]

(3)

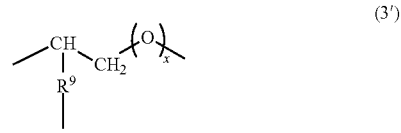

(3')

wherein x is 0 or 1 and $R^9$ is a direct bond or a C1-C8 alkylene group optionally containing an ether structure.

The alkylene group for $R^9$ preferably has a carbon number of 1 to 7, more preferably 1 to 5, still more preferably 1 to 3.

$R^3$ is more preferably a structure represented by the following formula (4):

[Chem. 6]

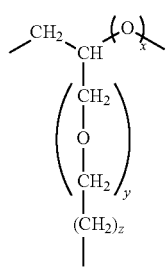

(4)

wherein x and y are the same as or different from each other and are each 0 or 1 and z is a number of 0 to 5.

z is preferably 0 to 3, more preferably 0 to 2, still more preferably 0 or 1.

A combination of x, y, and z, (x, y, z), is preferably (1, 1, 1), (1, 0, 1), or (0, 0, 0).

The (poly)alkylene glycol-containing compound of the present invention is preferably a compound represented by the following formula (1) or (2):

[Chem. 7]

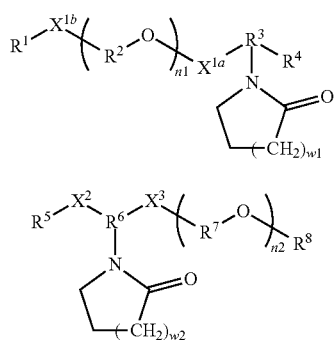

wherein in the formula (1), $R^1$ and $R^4$ are the same as or different from each other and are each a hydrogen atom or hydrophobic group, at least one of $R^1$ or $R^4$ being a hydrophobic group; $R^2$s are the same as or different from each other and are each a C2-C20 alkylene group; $R^3$ is a C2-C10 trivalent hydrocarbon group optionally containing a heteroatom; $X^{1a}$ and $X^{1b}$ are the same as or different from each other and are each a direct bond or a divalent linking group; n1 is a number of 1 to 100; and w1 is a number of 1 to 3,
in the formula (2), $R^5$ is a hydrocarbon group optionally containing a heteroatom and having a carbon number of 4 or greater; $R^8$ is a hydrogen atom or a hydrocarbon group optionally containing a heteroatom and having a carbon number smaller than that of $R^5$; $R^6$ is a C2-C50 trivalent hydrocarbon group optionally containing a heteroatom; $R^7$s are the same as or different from each other and are each a C2-C20 alkylene group; $X^2$ and $X^3$ are the same as or different from each other and are each a direct bond or a divalent linking group; n2 is a number of 1 to 100; and w2 is a number of 1 to 3.

The compound represented by the formula (1) is preferably a compound represented by the following formula (1'):

[Chem. 8]

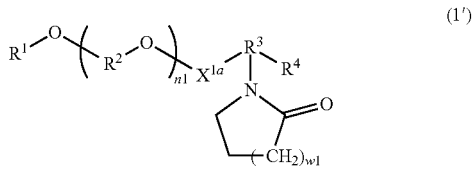

(1')

wherein in formula (1'), $R^1$ and $R^4$ are the same as or different from each other and are each a hydrogen atom or hydrophobic group, at least one of $R^1$ or $R^4$ being a hydrophobic group; $R^2$s are the same as or different from each other and are each a C2-C20 alkylene group; $R^3$ is a C2-C10 trivalent hydrocarbon group optionally containing a heteroatom; $X^{1a}$ is a direct bond or a divalent linking group; n1 is a number of 1 to 100; and w1 is a number of 1 to 3.

$R^1$ and $R^4$ in the formulas (1) and (1') are the same as or different from each other and are each a hydrogen atom or hydrophobic group, at least one of $R^1$ or $R^4$ may be a hydrophobic group, and both $R^1$ and $R^4$ may be hydrophobic groups. Preferably, $R^1$ is a hydrophobic group, and more preferably, both $R^1$ and $R^4$ are hydrophobic groups.

The hydrophobic group for $R^1$ and $R^4$ is preferably a hydrophobic organic group.

A specific example of the organic group is a hydrocarbon group optionally containing a substituent or heteroatom. Specific examples of the substituent and the heteroatom are the same as those described above.

The carbon number of the hydrocarbon group is preferably 1 to 50, more preferably 3 to 30, still more preferably 4 to 21, further preferably 8 to 18, particularly preferably 12 to 14.

The carbon number of the hydrocarbon group includes the carbon number of a substituent.

Examples of the hydrocarbon group include aliphatic alkyl, alicyclic alkyl, alkenyl, alkynyl, and aryl groups.

An example of the heteroatom-containing hydrocarbon group is a heterocyclic group.

Examples of the C1-C50 alkyl group include aliphatic alkyl groups such as methyl, ethyl, n-propyl, n-butyl, n-pentyl (amyl), n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosanyl, i-propyl, sec-butyl, i-butyl, t-butyl, 1-methylbutyl, 1-ethylpropyl, 2-methylbutyl, i-amyl, neopentyl, 1,2-dimethylpropyl, 1,1-dimethylpropyl, t-amyl, 1,3-dimethylbutyl, 3,3-dimethylbutyl, 2-ethylbutyl, 2-ethyl-2-methylpropyl, 1-methylheptyl, 2-ethylhexyl, 1,5-dimethylhexyl, t-octyl, 2,6-dimethyloctyl, and 2-butyloctyl groups, branched nonyl, decyl, undecyl, dodecyl, tridecyl, tetradecyl, pentadecyl, hexadecyl, heptadecyl, stearyl, icosyl, henicosyl, docosyl, tricosyl, tetracosyl, pentacosyl, hexacosyl, heptacosyl, octacosyl, nonacosyl, triacontyl, pentatriacontyl, tetracontyl, pentatetracontyl, and pentacontyl groups; and alicyclic alkyl groups such as cyclopropyl, cyclopropylmethyl, cyclobutyl, cyclobutylmethyl, cyclopentyl, cyclohexyl, cyclohexylmethyl, cycloheptyl, cyclooctyl, cyclohexylpropyl, cyclododecyl, norbornyl (C7), adamantyl (C10), cyclopentylethyl, cyclopropyloctadecyl, cyclobutylheptadecyl, cyclopentylhexadecyl, cyclohexylpentadecyl, cycloheptyltetradecyl, and cyclooctyltridecyl groups.

Examples of the C2-C50 alkenyl group include vinyl, allyl, 1-butenyl, 2-butenyl, pentenyl, hexenyl, heptenyl, octenyl, nonenyl, decenyl, dodecenyl, octadecenyl, icosenyl, eicosenyl, henicosenyl, docosenyl, tricosenyl, tetracosenyl, pentacosenyl, hexacosenyl, heptacosenyl, octacosenyl, nonacosenyl, triacontenyl, pentatriacontenyl, tetracontenyl, pentatetracontenyl, and pentacontenyl groups.

Examples of the C2-C50 alkynyl group include ethynyl, 1-propynyl, 2-propynyl, butynyl, pentynyl, hexynyl, heptynyl, octynyl, nonynyl, decynyl, dodecynyl, octadecynyl, icosynyl, eicosynyl, henicosynyl, docosynyl, tricosynyl, tetracosynyl, pentacosynyl, hexacosynyl, heptacosynyl, octacosynyl, nonacosynyl, triacontynyl, pentatriacontynyl, tetracontynyl, pentatetracontynyl, and pentacontynyl groups.

Examples of the C6-C50 aryl group include phenyl, naphthyl, anthracenyl, benzyl, 1-phenylethyl, 2-phenylethyl, 3-phenylpropyl, 4-phenylbutyl, styryl (Ph-CH=C—), cinnamyl (Ph-CH=CHCH$_2$—), 1-benzocyclobutenyl, 1,2,3,4-tetrahydronaphthyl, quaterphenyl, quinquephenyl, sexiphenyl, septiphenyl, octiphenyl, phenyl, naphthyl, fluorenyl, anthracenyl, phenanthryl, biphenyl, terphenyl, distyrenated phenyl groups and a group in which an alkyl group is attached to an aromatic ring of any of the benzenes, the naphthalenes, and the like.

The C6-C50 aryl group is preferably a group represented by the following formula (7):

$$—R^{10}—A^1 \qquad (7)$$

wherein $R^{10}$ is a direct bond or a C1-C30 alkylene group optionally containing a heteroatom and $A^1$ is an unsubstituted C6-C42 aromatic group.

The carbon number of the alkylene group for $R^{10}$ is preferably 1 to 18, more preferably 1 to 12, still more preferably 1 to 8, particularly preferably 1 to 4.

Specific examples of the alkylene group for $R^{10}$ include methylene, methylmethylene, ethylene, n-propylene, isopropylene, n-butylene, isobutylene, sec-butylene, tert-butylene, n-pentylene, isopentylene, neopentylene, hexylene, heptylene, octylene, nonylene, decylene, undecylene, dodecylene, tridecylene, tetradecylene, pentadecylene, hexadecylene, heptadecylene, and octadecylene groups.

$R^{10}$ may contain a heteroatom, and a carbon atom or hydrogen atom of the alkylene group may be replaced by a heteroatom. The heteroatom-containing alkylene group is preferably a group obtained by abstracting two hydrogen atoms from a C1-C30 alkylamine, for example.

$A^1$ is an unsubstituted C6-C42 aromatic group. The aromatic group has a structure in which atoms with n electrons are disposed in a circular manner. The carbon number of $A^1$ is preferably 6 to 18, more preferably 6 to 14, still more preferably 6 to 11.

The carbon number of the aromatic group is preferably a number represented by (4k+2). k is an integer of 1 to 4. k is preferably 1 to 3, more preferably 1 to 2, most preferably 1.

Specific examples of the aromatic group include phenyl, naphthyl, and anthracenyl groups. Preferred is a phenyl group.

The group represented by the formula (7) is preferably a phenyl, naphthyl, phenylalkylene, naphthylalkylene, N-alkyl-N-phenylamino, or N-alkyl-N-naphthylamino group.

Examples of the phenyl alkylene group include phenylmethylene (benzyl), phenylethylene, phenylpropylene, phenylbutylene, phenylpentylene, phenylhexylene, phenylheptylene, phenyloctylene, phenylnonylene, and phenyldecylene groups.

Examples of the naphthyl alkylene group include naphthylmethylene, naphthylethylene, naphthylpropylene, naphthylbutylene, naphthylpentylene, naphthylhexylene, naphthylheptylene, naphthyloctylene, naphthylnonylene, and naphthyldecylene groups.

Examples of the C2-C50 heterocyclic group include pyrrole, furan, thiophene, imidazole, pyrazole, oxazole, isooxazole, thiazole, isothiazole, tetrazole, pyridinyl, pyrimidinyl, pyridazinyl, pyrazinyl, 1,2,3-triazinyl, quinolinyl, isoquinolinyl, quinazolinyl, phthalazinyl, buteridinyl, coumarinyl, chromonyl, 1,4-benzodiazepinyl, indole, benzimidazole, benzofuranyl, purinyl, acridinyl, phenoxazinyl, and phenothiazinyl groups, and a group in which any of the above alkyl groups is attached to an aromatic heterocycle. The heterocyclic group is preferably an aromatic heterocyclic group having aromaticity, more preferably a tetrazole or imidazole group.

The carbon number of each of the optionally substituted alkyl, alkenyl, and alkynyl groups for $R^1$ is preferably 2 to 40, more preferably 4 to 30, still more preferably 8 to 20, particularly preferably 10 to 18, most preferably 12 to 14.

The carbon number of the optionally substituted aryl group for $R^1$ is preferably 6 to 40, more preferably 6 to 30, still more preferably 6 to 25.

The carbon number of the optionally substituted heterocyclic group is preferably 2 to 40, more preferably 2 to 30, still more preferably 2 to 20.

The hydrophobic group for $R^1$ is preferably an optionally substituted alkyl group, more preferably an optionally substituted aliphatic alkyl group, still more preferably an unsubstituted linear or branched aliphatic alkyl group.

$R^4$ is a hydrogen atom or hydrophobic group. When $R^4$ is a hydrophobic group, $R^4$ is preferably an optionally substituted alkyl group, more preferably an optionally substituted aliphatic alkyl group, still more preferably an unsubstituted linear or branched aliphatic alkyl group. $R^4$ is preferably a hydrogen atom or a C1-C3 alkyl group such as a methyl, ethyl, or propyl group, more preferably a methyl group or a hydrogen atom, still more preferably a methyl group.

Specific examples and preferred examples of $R^2$ and $R^7$ in the formulas (1) and (2) and preferred ranges of n1 and n2 are the same as those described for the formulas (5-1) and (5-2). Specific examples and preferred examples of $R^3$ in formula (1) and a preferred range of w1 are the same as those of $R^3$ and w in the formula (6).

Specific examples and preferred examples of $R^6$ in the formula (2) and a preferred range of w2 are the same as those of $R^3$ and w in the formula (6).

$R^5$ in the formula (2) is a hydrocarbon group having a carbon number of 4 or greater optionally containing a heteroatom. The carbon number of the hydrocarbon group is preferably 4 to 50, more preferably 5 to 30, still more preferably 6 to 21, further preferably 8 to 18, particularly preferably 12 to 14.

The hydrocarbon group for $R^5$ may be a heteroatom-containing hydrocarbon group or a hydrocarbon group free from a heteroatom. The heteroatom-containing hydrocarbon group refers to a hydrocarbon group in which at least one selected from the group consisting of the carbon atoms and the hydrogen atoms that constitute the hydrocarbon group is replaced by a heteroatom or heteroatom-containing substituent.

Specific examples of the heteroatom and the substituent are the same as those described above.

The carbon number of the hydrocarbon group includes the carbon number of a substituent.

Examples of the hydrocarbon group include aliphatic alkyl, alicyclic alkyl, alkenyl, alkynyl, and aryl groups.

Specific examples of the C4-C50 alkyl, C4-C50 alkenyl, C4-C50 alkynyl, and C4-C50 heterocyclic groups are the same as those described above.

The carbon number of each of the optionally substituted alkyl, alkenyl, and alkynyl groups for $R^5$ is preferably 4 to 40, more preferably 5 to 30, still more preferably 8 to 20, particularly preferably 10 to 18, most preferably 12 to 14.

The carbon number of the optionally substituted aryl group for $R^5$ is preferably 6 to 40, more preferably 6 to 30, still more preferably 6 to 25.

The carbon number of the optionally substituted heterocyclic group for $R^5$ is preferably 4 to 40, more preferably 5 to 30, still more preferably 6 to 20.

The hydrophobic group for $R^5$ is preferably an optionally substituted alkyl group or optionally substituted aryl group, more preferably an optionally substituted aliphatic alkyl group or an aryl group optionally containing an amino group and/or an alkyl group, still more preferably an unsubstituted linear or branched aliphatic alkyl group.

$R^8$ in the formula (2) is a hydrogen atom or a hydrocarbon group optionally containing a heteroatom and having a carbon number smaller than that of $R^5$. $R^8$ is preferably a C1-C3 alkyl group such as a methyl, ethyl, or propyl group. $R^8$ is more preferably a methyl group or hydrogen atom, still more preferably a hydrogen atom.

$X^{1a}$ and $X^{1b}$ in the formula (1) and $X^2$ and $X^3$ in the formula (2) are each a direct bond or divalent linking group.

Non-limiting examples of the divalent linking group include a polar group such as a urethane group (bond), ester group (bond), amide group (bond), ether group (bond), carbonyl group, carbonate group (bond), thioether group (bond), or isocyanate group and a divalent hydrocarbon group optionally containing any of these polar groups or a different substituent. Preferred among these are urethane, ester, amide, ether, carbonyl, carbonate, sulfur-containing divalent organic, and isocyanate groups.

When $X^{1a}$, $X^{1b}$, $X^2$, and $X^3$ are each an ester, amide, or urethane group, which is hydrolyzable, among the above-described linking groups, the PAG compound of the present invention has enhanced biodegradability. In terms of biodegradability, an ester group or amide group is more preferred, and an ester group is still more preferred.

Examples of the different substituent include hydroxy, alkoxy, carboxyl, acyl, sulfonate, amino, and phosphate groups.

The carbon number of the hydrocarbon group is preferably 1 to 5.

The divalent linking group for $X^{1a}$ is preferably a sulfur-containing structure.

The sulfur-containing structure may be any sulfur-containing divalent organic group and is preferably a structure represented by the following formula (8):

$$-R^{11}-S- \qquad (8)$$

wherein $R^{11}$ is a C1-C10 divalent organic group.

The C1-C10 divalent organic group is preferably an optionally substituted C1-C3 hydrocarbon group such as a carbonyl, hydroxy, carboxyl, or sulfonate group. The hydrocarbon group is preferably a group obtained by abstracting one hydrogen atom from a group such as an alkyl, alkenyl, alkynyl, or aryl group. Specific examples of the alkyl, alkenyl, alkynyl, and aryl groups are included in the above-described specific examples of the alkyl, alkenyl, alkynyl, and aryl groups. The sulfur-containing divalent linking group is more preferably a structure represented by the following formula (9):

[Chem. 9]

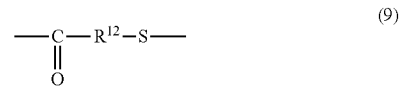

wherein $R^{12}$ is an optionally substituted C1-C9 alkylene group.

The carbon number of the alkylene group is preferably 1 to 8, more preferably 1 to 6, still more preferably 1 to 4, most preferably 2.

$R^{12}$ is preferably an unsubstituted alkylene group.

Examples of the alkylene group include methylene, methylmethylene, ethylene, n-propylene, isopropylene, n-butylene, isobutylene, sec-butylene, tert-butylene, n-pentylene, isopentylene, and neopentylene groups. Preferred among these are methylene, methylmethylene, ethylene, and n-propylene groups, with an ethylene group being more preferred.

$X^{1a}$ in the formula (1) and $X^3$ in the formula (2) are each preferably a direct bond, ether bond, or structure represented by the formula (9).

For example, a compound represented by the formula (1) in which $X^{1a}$ is represented by the formula (9) and a compound represented by the formula (2) in which $X^3$ is represented by the formula (9) are obtained by reacting mercapto carboxylic acid with a (poly)alkylene glycol compound to give a reaction product and reacting the reaction product with a lactam-containing compound.

$X^{1a}$ is more preferably a direct bond or ether group.

$X^{1b}$ is more preferably an ether group.

$X^2$ in the formula (2) is preferably a direct bond, urethane group (bond), ether group (bond), ester group (bond), or a group represented by the following formula (10):

[Chem. 10]

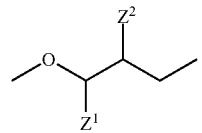

wherein $Z^1$ and $Z^2$ are each a hydrogen atom or hydroxy group, with one of $Z^1$ or $Z^2$ being a hydrogen atom and the other being a hydroxy group.

$X^2$ is more preferably a direct bond, ether group (bond), ester group (bond), or a group represented by the formula (10), still more preferably a direct bond, ether group (bond), or ester group (bond).

$X^3$ in the formula (2) is preferably a direct bond, ester group (bond), or ether group (bond), still more preferably a direct bond or ether group (bond).

<Method of Producing PAG Compound of the Present Invention>

The PAG compound of the present invention may be produced by any method. For example, it may be produced by a technique (i) of reacting a lactam-containing compound with a compound containing a hydrophobic group at one end of a (poly)alkylene glycol (a hydrophobic group-containing (poly)alkylene glycol); a technique (ii) including a first step of reacting a lactam-containing compound with a (poly) alkylene glycol free from a substituent having a carbon number not smaller than that of the hydrophobic structural moiety (A) (hereinafter, also referred to as (poly)alkylene glycol (a)) and a second step of reacting the resulting reaction product with a hydrophobic group-containing compound; or a technique (iii) including a first step of reacting a hydrophobic group-containing compound with a lactam-containing compound and a second step of reacting the reaction product obtained in the first step with an alkylene oxide. Herein, the hydrophobic group-containing (poly) alkylene glycol and the (poly)alkylene glycol free from a hydrophobic group are each also simply referred to as a (poly)alkylene glycol compound.

<Lactam-Containing Compound>

In the method of producing the PAG compound of the present invention, the lactam-containing compound may be any lactam-containing compound that can react with the hydrophobic group-containing (poly)alkylene glycol in the technique (i), the (poly)alkylene glycol (a) in the technique (ii), or the hydrophobic group-containing compound in the technique (iii). The lactam-containing compound is preferably a compound represented by the following formula (11):

[Chem. 11]

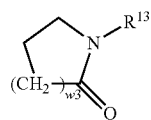

(11)

wherein $R^{13}$ is a hydrogen atom or a C2-C10 organic group containing a reactive functional group and w3 is a number of 1 to 3.

A preferred range of w3 is the same as that of W in the formula (6).

The carbon number of the organic group is preferably 2 to 8, more preferably 2 to 6, still more preferably 2 to 5.

Examples of the reactive functional group for $R^{13}$ include an epoxy group, a polymerizable unsaturated group such as a vinyl group, a halogen atom, a hydroxy group, a carboxyl group, and an amino group. Preferred is an epoxy, vinyl, or hydroxy group, with an epoxy or hydroxy group being more preferred.

The lactam-containing compound more preferably includes a lactam compound free from a reactive functional group other than an amino group, such as 2-pyrrolidone, 2-piperidone, or ε-caprolactam; a hydroxy group-containing pyrrolidone compound such as a hydroxyalkyl pyrrolidone; a compound represented by the following formula (12):

[Chem. 12]

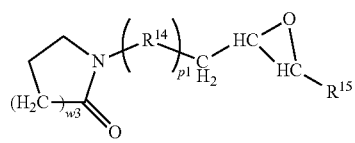

(12)

(wherein $R^{14}$s are the same as or different from each other and are each a C1-C20 oxyalkylene group; $R^{15}$ is a hydrogen atom or C1-C12 alkyl group; p1 is a number of 0 to 5; and w3 is a number of 1 to 3); and/or a compound represented by the following formula (13):

[Chem. 13]

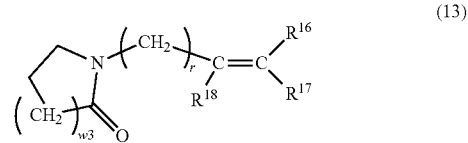

(13)

wherein r is a number of 0 to 5; $R^{16}$, $R^{17}$, and $R^{18}$ are the same as or different from each other and are each a hydrogen atom or C1-C5 alkyl group; and w3 is a number of 1 to 3.

In the formula (12), p1 is preferably 0 to 3, more preferably 0 to 2, still more preferably 0 or 1.

The oxyalkylene group for $R^{14}$ is preferably an oxyalkylene group having a carbon number of 2 to 4. When p1 is 1 or greater, oxyethylene groups (—CH$_2$CH$_2$O—) preferably constitute 50 mol % or more, more preferably 80 mol % or more of the oxyalkylene groups for $R^{14}$.

The carbon number of the alkyl group for $R^{15}$ is preferably 1 to 8, more preferably 1 to 4.

$R^{15}$ is preferably a hydrogen atom.

In the formula (13), r is preferably 0 to 3, more preferably 0 to 2, still more preferably 0 or 1, particularly preferably 0.

The carbon number of the alkyl group for each of $R^{16}$ to $R^{18}$ is preferably 1 to 3, more preferably 1 to 2, most preferably 1.

$R^{16}$ to $R^{18}$ are each preferably a hydrogen atom.

The lactam-containing compound is still more preferably a hydroxyalkyl pyrrolidone such as 1-(2-hydroxyethyl)-2-pyrrolidone; 2-pyrrolidone; or a compound represented by the following formula (14):

[Chem. 14]

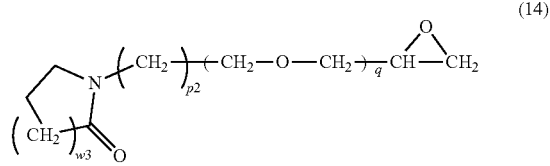

(14)

wherein p2 is a number of 0 to 5; q is 0 or 1; and w3 is a number of 1 to 3.

In the formula (14), p2 is preferably 0 to 3, more preferably 0 to 2, still more preferably 0 or 1.

In the formula (13), a combination of p2 and q, (p2, q), is preferably (1, 1) or (1, 0).

The compound represented by the formula (11) can be produced, for example, by introducing the reactive functional group into a lactam compound such as 1-(2-hydroxyethyl)-2-pyrrolidone, 2-pyrrolidone, 2-piperidone, or ε-caprolactam. Preferably, the compound represented by the formula (11) is produced by reacting a lactam compound with a compound containing in addition to the reactive functional group a functional group that can react with a hydroxy group or nitrogen atom of the lactam compound. Examples of the functional group that can react with a hydroxy group or nitrogen atom of the lactam compound include an epoxy group, a halogen atom, a hydroxy group, a carboxyl group, and an amino group. Preferred is a halogen atom. Examples of the halogen atom include fluorine, chlorine, bromine, and iodine atoms. Preferred is a chlorine atom.

For example, the compound represented by the formula (14) can be produced by reacting a compound containing an epoxy group and a halogen atom with N-hydroxyethyl pyrrolidone, N-hydroxypropyl pyrrolidone, N-hydroxybutyl pyrrolidone, N-hydroxypentyl pyrrolidone, N-hydroxyhexyl pyrrolidone, 2-pyrrolidone, 2-piperidone, or ε-caprolactam.

The compound containing an epoxy group and a halogen atom is preferably an epihalohydrin, more preferably epichlorohydrin.

Specific examples of the compound represented by the formula (13) include N-vinylpyrrolidone, 1-(2-propenyl)-2-pyrrolidone, N-vinyl piperidone, and N-vinylcaprolactam. Preferred is N-vinylpyrrolidone.

<Hydrophobic Group-Containing (Poly)Alkylene Glycol>

The hydrophobic group-containing (poly)alkylene glycol in the technique (i) may be any compound that contains any of the above-described hydrophobic groups and a (poly)alkylene glycol chain and is capable of reacting with the lactam-containing compound. The hydrophobic group-containing (poly)alkylene glycol is preferably a compound represented by the following formula (15):

[Chem. 15]

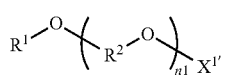
(15)

wherein $R^1$ is a hydrophobic group; $R^2$s are the same as or different from each other and are each a C2-C20 alkylene group; $X^{1'}$ is a hydrogen atom or a C1-C10 organic group containing a reactive functional group; and n1 is a number of 1 to 100.

Specific examples and preferred examples of $R^1$ and $R^2$ in the formula (15) are the same as those described for the formula (1) and the like.

The reactive functional group for $X^{1'}$ may be any group that can form a bond with the reactive functional group of the lactam-containing compound, and examples thereof include a thiol group, an epoxy group, a glycidyl ether group, a vinyl group, a halogen atom, a hydroxy group, a carboxyl group, an amino group, and a hypophosphite group.

The organic group for $X^{1'}$ may contain a functional group in addition to the functional group that forms a bond with the lactam-containing compound, and it may contain a carbonyl group or hydroxy group, for example.

$X^{1'}$ is preferably a hydrogen atom or a group represented by the following formula (16):

—$R^{11}$—SH (16)

wherein $R^{11}$ is a C1-C10 divalent organic group.

$X^{1'}$ is more preferably a hydrogen atom or a group represented by the following formula (17):

[Chem. 16]

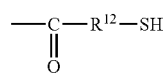
(17)

wherein $R^{12}$ is an optionally substituted C1-C10 alkylene group.

When the lactam-containing compound is a compound containing a reactive functional group such as an epoxy group, the hydrophobic group-containing (poly)alkylene glycol is preferably a compound represented by the formula (15) in which $X^{1'}$ is a hydrogen atom or glycidyl ether group.

When the lactam-containing compound is a compound containing a polymerizable unsaturated group such as a vinyl group, the hydrophobic group-containing (poly)alkylene glycol is preferably a compound represented by the formula (15) in which $X^{1'}$ is a group represented by the formula (17).

Specific examples and preferred examples of $R^{11}$ in the formula (16) and $R^{12}$ in the formula (17) are the same as those described for the formulas (8) and (9).

The compound represented by the formula (15) in which $X^{1'}$ is a hydrogen atom can be obtained, for example, by adding an alkylene oxide such as ethylene oxide to a hydrophobic group-containing alcohol. Alternatively, the compound may be a commercial product.

The compound represented by the formula (15) in which $X^{1'}$ is a group represented by the formula (17) can be obtained by reacting a mercaptocarboxylic acid with a compound represented by the formula (15) in which $X^{1'}$ is a hydrogen atom. Specific examples of the mercaptocarboxylic acid include thioglycolic acid (mercaptoacetic acid), 3-mercaptopropionic acid, 2-mercaptopropionic acid (thiolactic acid), 4-mercaptobutanoic acid, and thiomalic acid. Preferred is 3-mercaptopropionic acid.

<(Poly)Alkylene Glycol (a)>

The (poly)alkylene glycol (a) in the technique (ii) may be any compound that contains a reactive functional group at at least one end thereof and is not terminated with a substituent having a carbon number not smaller than that of the hydrophobic structural moiety (A). The (poly)alkylene glycol (a) is preferably a compound represented by the following formula (18):

$X^{3'}$—$(R^7O)_{n2}$—$R^{8'}$ (18)

wherein $R^{8'}$ is a hydrogen atom or a substituent having a carbon number smaller than that of the hydrophobic structural moiety (A); $R^7$s are the same as or different from each other and are each a C2-C20 alkylene group; $X^{3'}$ is a hydrogen atom or a reactive functional group; and n2 are the same as or different from each other and is a number of 1 to 100.

Specific examples and preferred examples of n2, $R^7$, and $R^{8'}$ in the formula (18) are the same as those of n2, $R^7$, and $R^8$ in the formula (2).

The reactive functional group for $X^{3'}$ may be any group that can form a bond with the reactive functional group of the lactam-containing compound, and examples thereof include a thiol group, an epoxy group, a vinyl group, a halogen atom, a hydroxy group, a carboxyl group, an amino group, and a hypophosphite group.

$X^{3'}$ is preferably a hydrogen atom.

A (poly)alkylene glycol (a) represented by the formula (18) in which $R^{8'}$ is a C1-C3 alkyl group and $X^{3'}$ is a hydrogen atom can be obtained, for example, by reacting an alkylene oxide with a C1-C3 alkyl alcohol. Alternatively, the (poly)alkylene glycol (a) may be a commercial product.

<Hydrophobic Group-Containing Compound>

The hydrophobic group-containing compound in the second step in the technique (ii) and the first step in the technique (iii) may be any hydrophobic group-containing compound that can react with a reaction product of the lactam-containing compound and the (poly)alkylene glycol compound. The hydrophobic group-containing compound is preferably a compound represented by the following formula (19):

$$R^1-X^{2'} \quad (19)$$

wherein $R^1$ is a hydrophobic group and $X^{2'}$ is a reactive functional group.

Specific examples and preferred examples of $R^1$ in the formula (19) are the same as those described for the formula (1).

$X^{2'}$ in the formula (19) may be any functional group that can react with the hydroxy group at an end of the (poly)alkylene glycol of the reaction product of the lactam-containing compound and the (poly)alkylene glycol compound. Examples of $X^{2'}$ include a halogen atom and epoxy, glycidyl, hydroxy, carboxyl, amino, and isocyanate groups. $X^2$ is preferably a halogen atom or a glycidyl group.

Examples of the halogen atom include fluorine, chlorine, bromine, and iodine atoms. Preferred are chlorine and iodine atoms.

Specific examples of the hydrophobic group-containing compound represented by the formula (19) include a hydroxy group- and hydrophobic group-containing compound such as a C1-C50 alkyl alcohol, alkenyl alcohol, or aryl alcohol; a halogen- and hydrophobic group-containing compound such as a C1-C50 halogenated alkyl; a glycidyl ether group- and hydrophobic group-containing compound such as a C4-C50 alkyl glycidyl ether; an epoxy group- and hydrophobic group-containing compound such as a C2-C50 epoxy alkane; an isocyanate group- and hydrophobic group-containing compound such as a C2-C50 alkyl isocyanate; an amino group- and hydrophobic group-containing compound such as a C1-C50 alkylamine, arylamine, or N-alkyl-N-aryl amine; and a C2-C50 carboxylic acid.

Preferred among these are a hydroxy group- and hydrophobic group-containing compound and a halogen- and hydrophobic group-containing compound.

Preferred examples of the C1-C50 alkyl alcohol include methyl alcohol, ethyl alcohol, propyl alcohol, butyl alcohol, pentyl alcohol, hexyl alcohol, heptyl alcohol, octyl alcohol, nonyl alcohol, decyl alcohol, undecyl alcohol, dodecyl alcohol (lauryl alcohol), tridecyl alcohol, tetradecyl alcohol, pentadecyl alcohol, hexadecyl alcohol, heptadecyl alcohol, octadecyl alcohol, nonadecyl alcohol, and icosyl alcohol.

Preferred examples of the C2-C50 alkenyl alcohol include vinyl alcohol, propenyl alcohol, isopropenyl alcohol, 3-butenyl alcohol, 2-pentenyl alcohol, 3-pentenyl alcohol, 4-pentenyl alcohol, 2-methyl-2-butenyl alcohol, 2-methyl-3-butenyl alcohol, 4-hexenyl alcohol, 6-heptenyl alcohol, 2-methyl-5-hexenyl alcohol, 7-octenyl alcohol, cis-3-octen-1-ol, 2-methyl-7-octenyl alcohol, 8-nonenyl alcohol, 9-decenyl alcohol, and oleyl alcohol.

Preferred examples of the C6-C50 aryl alcohol include phenyl alcohol, methylphenyl alcohol (o-cresol, m-cresol, or p-cresol), creosol, ethylphenyl alcohol, propylphenyl alcohol, butylphenyl alcohol, butylmethylphenyl alcohol, dimethylphenyl alcohol, diethylphenyl alcohol, dibutylphenyl alcohol, hydroxybiphenyl, 4-hydroxymethyl biphenyl, 3-hydroxymethyl biphenyl, 4-hydroxyethyl biphenyl, 3-hydroxyethyl biphenyl, naphthol, 1-hydroxymethyl-naphthalene, 1-hydroxyethyl-naphthalene, 2-hydroxymethyl-naphthalene, and 2-hydroxyethyl-naphthalene.

Preferred examples of the C1-C50 halogenated alkyl include halogenated butyl, halogenated pentyl, halogenated hexyl, halogenated heptyl, halogenated octyl, halogenated nonyl, halogenated decyl, halogenated undecyl, halogenated dodecyl, halogenated tridecyl, halogenated tetradecyl, halogenated pentadecyl, halogenated hexadecyl, halogenated heptadecyl, halogenated octadecyl, halogenated nonadecyl, and halogenated icosyl.

Preferred examples of the C4-C50 alkyl glycidyl ether include methyl glycidyl ether, ethyl glycidyl ether, propyl glycidyl ether, butyl glycidyl ether, pentyl glycidyl ether, hexyl glycidyl ether, heptyl glycidyl ether, octyl glycidyl ether, nonyl glycidyl ether, decyl glycidyl ether, undecyl glycidyl ether, dodecyl glycidyl ether (lauryl glycidyl ether), tridecyl glycidyl ether, tetradecyl glycidyl ether, pentadecyl glycidyl ether, hexadecyl glycidyl ether, heptadecyl glycidyl ether, octadecyl glycidyl ether, nonadecyl glycidyl ether, and icosyl glycidyl ether.

Preferred examples of the C2-C50 epoxyalkane include the above-described ethylene oxide; 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytetradecane, 1,2-epoxypentadecane, 1,2-epoxyhexadecane, 1,2-epoxyheptadecane, 1,2-epoxyoctadecane, 1,2-epoxynonadecane, and 1,2-epoxyeicosane.

Preferred examples of the C2-C50 alkyl isocyanate include methyl isocyanate, ethyl isocyanate, propyl isocyanate, butylisocyanate, pentyl isocyanate, hexyl isocyanate, heptyl isocyanate, octyl isocyanate, nonyl isocyanate, decyl isocyanate, undecyl isocyanate, dodecyl isocyanate, tridecyl isocyanate, tetradecyl isocyanate, pentadecyl isocyanate, hexadecyl isocyanate, heptadecyl isocyanate, octadecyl isocyanate, nonadecyl isocyanate, and icosyl isocyanate.

Preferred examples of the C1-C50 alkylamine include methylamine, ethylamine, propylamine, butylamine, pentylamine, hexylamine, heptylamine, octylamine, nonylamine, decylamine, undecylamine, dodecylamine (laurylamine), tridecylamine, tetradecylamine, pentadecylamine, hexadecylamine, heptadecylamine, octadecylamine, nonadecylamine, and icosylamine.

Preferred examples of the C6-C50 arylamine include aniline and benzylamine.

Preferred examples of the C7-C50 N-alkyl-N-arylamine include N-methylaniline, N-ethylaniline, N-propylaniline, N-butylaniline, N-pentylaniline, N-hexylaniline, N-heptylaniline, N-octylaniline, N-nonylaniline, N-decylaniline, N-undecylaniline, N-dodecylaniline, N-tridecylaniline, N-tetradecylaniline, N-pentadecylaniline, N-tert-butyl-3,5-dimethylaniline, N-methylbenzylamine, N-butylbenzylamine, and N-tert-butyl-benzylamine.

Examples of the C2-C50 carboxylic acid include a saturated fatty acid such as acetic acid, propionic acid, butyric acid, valeric acid, pivalic acid, caproic acid, enanthic acid, caprylic acid, 2-ethylhexanoic acid, pelargonic acid, capric acid, undecylic acid, lauric acid, tridecylic acid, myristic acid, pentadecylic acid, palmitic acid, margaric acid, stearic acid, nonadecylic acid, or arachidic acid; a monounsaturated fatty acid such as acrylic acid, methacrylic acid, crotonic acid, myristoleic acid, palmitoleic acid, sapienic acid, oleic acid, elaidic acid, vaccenic acid, gadoleic acid, eicosenoic acid (paullinic acid), erucic acid, or nervonic acid; a diunsaturated fatty acid such as linoleic acid, eicosadienoic acid, or docosadienoic acid; a triunsaturated fatty acid such as α-linolenic acid, γ-linolenic acid, pinolenic acid, eleostearic acid, mead acid, dihomo-γ-linolenic acid, or eicosatrienoic acid; a tetraunsaturated fatty acid such as stearidonic acid, arachidonic acid, eicosatetraenoic acid, or adrenic acid; a pentaunsaturated fatty acid such as bosseopentaenoic acid, eicosapentaenoic acid, docosapentaenoic acid, osbond acid, clupanodonic acid, or tetracosapentaenoic acid; and a hexa-unsaturated fatty acid such as docosahexaenoic acid or nisinic acid.

<Reaction in Technique (i) and First Steps in Techniques (ii) and (iii)>

In the techniques (i) and (ii) as the method of producing a PAG compound, the lactam-containing compound is preferably used in an amount of 100 to 10000 mol % relative to 100 mol % of the (poly)alkylene glycol compound. The amount is more preferably 200 to 10000 mol %, still more preferably 200 to 5000 mol %, particularly preferably 200 to 1000 mol %.

In the first step in the technique (ii), the (poly)alkylene glycol compound is preferably used in an amount of 1 to 100 mol % relative to 100 mol % of the lactam-containing compound used. The amount is more preferably 5 to 100 mol %, still more preferably 10 to 100 mol %.

In the first step in the technique (iii), the hydrophobic group-containing compound is preferably used in an amount of 1 to 100 mol % relative to 100 mol % of the lactam-containing compound used. The amount is more preferably 5 to 100 mol %, still more preferably 10 to 100 mol %.

A catalyst is preferably used in the reaction of the lactam-containing compound and the hydrophobic group-containing (poly)alkylene glycol in the technique (i) and the reaction of the lactam-containing compound and the (poly)alkylene glycol free from a hydrophobic group in the technique (ii) in terms of reaction rate. Examples of the catalyst include an acid catalyst such as a mineral acid (e.g., sulfuric acid, phosphoric acid) or a Lewis acid (e.g., tin tetrachloride, boron trifluoride); a base catalyst such as an alkali metal hydroxide (e.g., sodium hydroxide, potassium hydroxide); or a polymerization catalyst.

Examples the polymerization catalyst include a persulfate such as ammonium persulfate, sodium persulfate, or potassium persulfate; hydrogen peroxide; and a water-soluble azo initiator such as an azoamidine compound (e.g., 2,2'-azobis-2-methylpropionamidine hydrochloride), a cyclic azoamidine compound (e.g., 2,2'-azobis-2-(2-imidazolin-2-yl)propane hydrochloride), and an azonitrile compound (e.g., 2-carbamoyl azoisobutyronitrile).

The base catalyst is preferably used when a lactam-containing compound containing a reactive functional group such as an epoxy group is reacted with a (poly)alkylene glycol compound including a polyalkylene glycol terminated with a reactive functional group such as a hydroxy group. The base catalyst is more preferably sodium hydroxide.

The water-soluble azo initiator is preferably used when a lactam-containing compound containing a polymerizable unsaturated group such as a vinyl group is reacted with a (poly)alkylene glycol compound terminated with a thiol group. The water-soluble azo initiator is more preferably an azoamidine compound.

The catalyst is preferably used in an amount of 0.5 to 10 mol %, more preferably 1 to 5 mol % relative to 100 mol % of the (poly)alkylene glycol compound. The catalyst is preferably used in an amount of 1 to 200 mol %, more preferably 2 to 100 mol % relative to 100 mol % of the lactam-containing compound.

The reaction temperature in the reaction of the lactam-containing compound and the (poly)alkylene glycol compound may be any temperature and is preferably 20° C. to 180° C., more preferably 30° C. to 160° C. The reaction pressure is preferably from atmospheric pressure to 20 kg/cm²G or lower, more preferably from 1 to 10 kg/cm²G.

The reaction is preferably performed in an inert gas atmosphere such as nitrogen gas. Alternatively, a reaction product after reaction may be stored in an inert gas atmosphere such as nitrogen gas.

After the reaction in the technique (i), the reaction product may be reacted with the same compound as a compound represented by the formula (19) as needed.

In the reaction, the above-described base catalyst is preferably used. The preferred ranges of the reaction temperature and pressure and the preferred atmosphere in the reaction are the same as those in the reaction in the technique (i) and the first step in the technique (ii).

<Second Steps in Techniques (ii) and (iii)>

In the second steps in the techniques (ii) and (iii), the above-described base catalyst is preferably used.

The preferred ranges of the reaction temperature and pressure and the preferred atmosphere in the second steps in the techniques (ii) and (iii) are the same as those in the reaction in the technique (i) and the first step in the technique (ii).

The alkylene oxide is preferably used in the second step in the technique (iii) in an amount of 100 to 10000 mol % relative to 100 mol % of the reaction product obtained in the first step. The amount is more preferably 100 to 5000 mol %, still more preferably 100 to 1000 mol %.

The catalyst is preferably used in each of the second steps in the techniques (ii) and (iii) in an amount of 0.01 to 200 mol % relative to 100 mol % of the reaction product obtained in the first step. The amount is more preferably 0.02 to 200 mol %.

The method of producing the PAG compound of the present invention may include purification during or after the reaction in the technique (i) or during or after the first step or second step in the technique (ii) or (iii), as needed.

Examples of the purification include removal of components such as residual materials, by-products, moisture, or residual catalysts and neutralization of catalysts.

For example, the solution after the reaction is preferably purified by dialysis using a dialysis membrane with a molecular weight cut-off corresponding to the molecular weight of a target compound.

<Composition Containing PAG Compound of the Present Invention>

A composition containing the PAG compound of the present invention essentially contains the PAG compound of the present invention. The composition may contain in addition to the PAG compound of the present invention a different component such as an unreacted material, a by-product, a residual catalyst, or a solvent.

The composition preferably contains the PAG compound of the present invention in an amount of 1 to 99.9% by mass, more preferably 1 to 99% by mass based on 100% by mass of the composition.

Specifically, the composition containing the (poly)alkylene glycol-containing compound of the present invention contains a (poly)alkylene glycol-containing compound and a different component other than the compound. The amount of the polyalkylene glycol-containing compound is 1 to 99.9% by mass, preferably 30 to 99.9% by mass, still more preferably 50 to 99.9% by mass based on 100% by mass of the composition.

<Uses of PAG Compound of the Present Invention>

The (poly)alkylene glycol-containing compound of the present invention is used in various applications such as a detergent builder, a detergent, a powder detergent, a liquid detergent, a pouched detergent, a laundry detergent, a hand dishwashing detergent, an automatic dishwasher detergent, a hard surface detergent, a surface modifier, a chemical for water treatment, a scale inhibitor, and a dispersant. Preferably, the compound of the present invention is used for a detergent builder and a detergent, for example.

<Detergent Composition>

The present invention also relates to a detergent composition containing the (poly)alkylene glycol-containing compound of the present invention and a detergent additive other than the compound.

The detergent additive other than the (poly)alkylene glycol-containing compound may be a surfactant or any additive used for common detergents. The detergent additive may be selected by appropriately referring to common knowledge in the detergent field.

The detergent composition may also be a powder detergent composition or liquid detergent composition.

The surfactant preferably includes one or more selected from the group consisting of an anionic surfactant, a nonionic surfactant, a cationic surfactant, and an amphoteric surfactant.

Suitable examples of the anionic surfactant include an alkylbenzene sulfonate, an alkyl ether sulfate, an alkenyl ether sulfate, an alkyl sulfate, an alkenyl sulfate, an α-olefin sulfonate, an α-sulfonated fatty acid and an ester thereof, an alkane sulfonate, a saturated fatty acid salt, an unsaturated fatty acid salt, an alkyl ether carboxylate, an alkenyl ether carboxylate, an amino acid-based surfactant, a N-acylamino acid-based surfactant, an alkyl phosphoric acid ester and a salt thereof, and an alkenyl phosphoric acid ester and a salt thereof. The alkyl group or alkenyl group of any of the anionic surfactants may contain an alkyl group such as a methyl group as a branch.

Suitable examples of the nonionic surfactant include a polyoxyalkylene alkyl ether, a polyoxyalkylene alkenyl ether, a polyoxyethylene alkylphenyl ether, a higher fatty acid alkanolamide and an adduct thereof with an alkylene oxide, a sucrose fatty acid ester, an alkyl glycoxide, a fatty acid glycerol monoester, and an alkylamine oxide. The alkyl group or alkenyl group of any of the nonionic surfactants may contain an alkyl group such as a methyl group as a branch.

A suitable example of the cationic surfactant is a quaternary ammonium salt. Suitable examples of the amphoteric surfactant include a carboxyl-type amphoteric surfactant and a sulfobetaine-type amphoteric surfactant. The alkyl group or alkenyl group of any of the cationic surfactant and the amphoteric surfactants may contain an alkyl group such as a methyl group as a branch.

The surfactant is typically present in the detergent composition in a proportion of 10 to 60% by mass, preferably 15 to 50% by mass, more preferably 20 to 45% by mass, particularly preferably 25 to 40% by mass based on the total amount of the detergent composition. When the proportion of the surfactant is too low, sufficient detergency may be failed to be exhibited, whereas when the proportion of the surfactant is too high, economic efficiency may be low.

EXAMPLES

The present invention is described in further detail below with reference to examples, but the present invention is not limited to these examples. It should be noted that the terms "part(s)" and "%" refer to "part(s) by mass" and "% by mass", respectively, unless otherwise stated.

<Detergency Evaluation 1 for Composite Stains (Oil/Protein/Mud/Carbon Black) (Usual Conditions)>

(1) The degree of whiteness of each of 5 cm×5 cm artificially stained wet fabrics (available from Sentaku Kagaku Kyokai) was measured in advance based on the reflectance using a color difference meter SE 6000 (Nippon Denshoku Industries Co., Ltd.).

(2) Pure water was added to calcium chloride dihydrate (7.34 g) to prepare 20 kg of hard water.

(3) In a 20-mL vial, 10 g of an aqueous solution of each sample to be evaluated (solid content: 2%) was prepared.

(4) Sodium linear alkylbenzene sulfonate (LAS) (0.5 g), sodium sulfate (2 g), and sodium carbonate (0.5 g) as detergent components were weighed in a beaker.

(5) To the beaker in (4) was added the hard water prepared in (2) to prepare 2 kg of a wash solution.

(6) A Terg-o-Tometer was set at 25° C., and each of pots was charged with the wash solution (500 mL) prepared in (5) and the aqueous solution (1.0 mL) of each sample prepared in (3). The contents were stirred at 100 rpm for two minutes. Thereafter, five stained fabrics and 14.6 g of a cotton fabric (5 cm×5 cm in size, Style 460 available from Testfabrics, Inc.) for liquor ratio control were put into each pot, and the contents were stirred at 100 rpm for 10 minutes (a reference prepared by adding pure water instead of the solution of each sample prepared in (3) was also evaluated).

(7) The stained fabrics taken out from each pot were wrung out by hand to remove water. To the fabrics in each pot was added the hard water (500 mL) prepared in (2). The contents were controlled to 25° C. and stirred at 100 rpm for four minutes.

(8) The stained fabrics taken out from each pot were wrung out by hand to remove water and dried at room temperature overnight. Thereafter, the degree of whiteness of the stained fabrics was measured again based on the reflectance using the color difference meter.

(9) The degree of whiteness of the Style 460 as an unstained fabric (hereinafter, also referred to as white fabric) was measured based on the reflectance as in (8).

(10) A degree of stain removal (detergency) was determined from the resulting measurement values using the following equation:

Degree of stain removal (%)=((degree of whiteness of stained fabric before washing)−(degree of whiteness of stained fabric after washing))/((degree of whiteness of stained fabric before washing)−(degree of whiteness of white fabric))× 100.

A higher degree of stain removal indicates better detergency.

Detergency Evaluation 2 for Composite Stains (Oil/Protein/Mud/Carbon Black) (Short-Time Conditions)>

(1) The degree of whiteness of each of 5 cm×5 cm artificially stained wet fabrics (available from Sentaku Kagaku Kyokai) was measured in advance based on the reflectance using a color difference meter SE 6000 (Nippon Denshoku Industries Co., Ltd.).

(2) Pure water was added to calcium chloride dihydrate (7.34 g) to prepare 20 kg of hard water.

(3) In a 20-mL vial, 10 g of an aqueous solution of each sample to be evaluated (solid content: 2%) was prepared.

(4) Sodium linear alkylbenzene sulfonate (LAS) (0.5 g), sodium sulfate (pure water) (2 g), and sodium carbonate (0.5 g) as detergent components were weighed in a beaker.
(5) To the beaker in (4) was added the hard water prepared in (2) to prepare 2 kg of a wash solution.
(6) A Terg-o-Tometer was set at 25° C., and each of pots was charged with the wash solution (500 mL) prepared in (5) and the aqueous solution (1.0 mL) of each sample prepared in (3). The contents were stirred at 100 rpm for two minutes. Thereafter, five stained fabrics and 14.6 g of a cotton fabric (5 cm×5 cm in size, Style 460 available from Testfabrics, Inc.) for liquor ratio control were put into each pot, and the contents were stirred at 100 rpm for three minutes (a reference prepared by adding pure water instead of the solution of each sample prepared in (3) was also evaluated).
(7) The stained fabrics taken out from each pot were wrung out by hand to remove water. To the fabrics in each pot was added the hard water (500 mL) prepared in (2). The contents were controlled to 25° C. and stirred at 100 rpm for two minutes.
(8) The stained fabrics taken out from each pot were wrung out by hand to remove water and dried at room temperature overnight. Thereafter, the degree of whiteness of the stained fabrics was measured again based on the reflectance using the color difference meter.
(9) The degree of whiteness of the Style 460 as an unstained fabric (hereinafter, also referred to as white fabric) was measured based on the reflectance as in (8).
(10) A degree of stain removal (detergency) under the short-time conditions was determined from the resulting measurement values using the following equation:

Degree of stain removal (%) under short-time conditions=((degree of whiteness of stained fabric before washing)−(degree of whiteness of stained fabric after washing))/((degree of whiteness of stained fabric before washing)−(degree of whiteness of white fabric))×100.

A higher degree of stain removal indicates better detergency under the short-time conditions and faster washing speed.

<Measurement of Interfacial Tension Between Oleic Acid and Water>

(1) Pure water was added to sodium linear alkylbenzene sulfonate (LAS) (1.2 g) to prepare 3 kg of a LAS aqueous solution.
(2) To the solution prepared in (1) was added an aqueous sodium hydroxide solution to control the pH to 10.5.
(3) In a 10-mL vial, 5 g of an aqueous solution of each sample to be evaluated (solid content: 2%) was prepared.
(4) A 100-mL vial was charged with the solution prepared in (2) (100 g) and the solution prepared in (3) (0.2 g) to prepare an aqueous solution to be measured.
(5) A glass cell of an interfacial tension meter (contact angle meter B100 available from Asumi Giken, Limited) was charged with the solution prepared in (4) and set in a measurement position.
(6) A syringe attached to a dispenser was charged with oleic acid.
(7) The dispenser was attached to the meter such that the tip of a syringe needle sank into the solution in the glass cell.

<Biodegradation Test>

(1) Pure water was added to dipotassium monohydrogen phosphate (2.175 g), monopotassium dihydrogen phosphate (0.85 g), disodium monohydrogen phosphate dodecahydrate (4.46 g), and ammonium chloride (0.17 g) to prepare 100 ml of a medium solution A.
(2) Pure water was added to magnesium sulfate heptahydrate (2.25 g) to prepare 100 ml of a medium solution B.
(3) Pure water was added to calcium chloride dihydrate (3.364 g) to prepare 100 ml of a medium solution C.
(4) Pure water was added to iron chloride hexahydrate (0.025 g) to prepare 100 ml of a medium solution D.
(5) The medium solutions A to D prepared in (1) to (4) each in an amount of 3 mL were mixed, and to the mixture was added pure water to prepare 1000 ml of a medium.
(6) In a 10-ml vial, 5 g of an aqueous solution of each sample to be evaluated (solid content: 2%) was prepared. Separately, as a comparative example, 5 g of an aqueous solution of aniline (solid content: 1%), the index substance for biodegradability, was prepared.
(7) The weight of each of five filters with a pore size of 1.0 μm (fiberglass filters AP1504700 available from Merck) was measured. Then, 5 ml of return sludge (active sludge) taken in a sewage plant was subjected to suction filtration using each filter After the filtration, the filter was placed in a metal vat and dried by heating at 105° C. for two hours with a dryer. Thereafter, the weight of the dried filter was measured.
(8) A sludge concentration was calculated from the measurement results obtained in (7) using the following equation.

Sludge concentration (ppm)=((weight of filters after filtration)−(weight of filters before filtration))/5×1000000

(9) Based on the concentration determined in (8), the sludge was diluted with the medium prepared in (5) such that the concentration of the sludge was 1000 ppm.
(10) Into incubator bottles of a BOD tester 200F (Tietech Co., Ltd.) was put 0.5 ml of one of the aqueous sample solutions prepared in (6) or an aqueous aniline solution, 90 ml of the medium prepared in (5), and 10 ml of the sludge dilution obtained in (9). Thus, sample evaluation solutions were prepared. Separately, a blank solution containing only 90 ml of the medium prepared in (5) and 10 ml of the sludge dilution obtained in (9) was prepared. Two sets of sample solutions were prepared for those not containing aniline.
(11) To the lid of each incubator bottle was added 1 mL of a 48% aqueous sodium hydroxide solution for carbon dioxide absorption, and the incubator bottle was set in an apparatus whose temperature was controlled to 25° C., and a test was started.
(12) The biodegradability was evaluated by measuring the amount of oxygen consumed per unit solution volume as biochemical oxygen demand (BOD). The oxygen consumption was measured by examining changes in the water level in the burette mounted on the incubator bottle. The biodegradation rate was calculated from the oxygen consumption after 28 days using the following equation.

Biodegradation rate (%)=(((oxygen consumption of sample)−(oxygen consumption of blank))/(theoretical oxygen demand))×100

Synthesis Example of Monomer (1)

A 500-ml four-necked glass recovery flask reaction vessel equipped with a thermometer, a stirrer, and a reflux tube was charged with 103.66 g (0.90 mol) of 1-(2-hydroxyethyl)-2-pyrrolidone (hereinafter, also referred to as HEP) and 249.80 g (2.70 mol) of epichlorohydrin (hereinafter, also referred to as ECH). The contents were heated to 40° C. under stirring using a stirrer. Thereafter, while the temperature was maintained at 50° C. or lower, 36.0 g (0.90 mol) of granular sodium hydroxide was added in ten portions, followed by addition of 36.0 g (0.90 mol) of granular sodium hydroxide in two portions. The contents were stirred for one hour at 50° C. The reaction solution was cooled to room temperature, and the produced salts were removed by suction filtration. Subsequently, the filtrate was subjected to evaporation to give a crude product, and epichlorohydrin remaining therein was mostly removed, followed by complete removal of the remaining epichlorohydrin by pressure distillation. Thus, an epoxy ring-containing pyrrolidone compound (hereinafter, also referred to as a monomer (1) or HEP-ECH (ECH-HEP)) was obtained.

Synthesis Example of Monomer (2)

A 2-L four-necked glass recovery flask reaction vessel equipped with a thermometer, a stirrer, and a reflux tube was charged with 297.89 g (3.50 mol) of 2-pyrrolidone (hereinafter, also referred to as 2Py) and 971.46 g (10.50 mol) of epichlorohydrin. The contents were heated to 45° C. under stirring using a stirrer. Thereafter, while the temperature was maintained at 50° C. or lower, 140.0 g (3.50 mol) of granular sodium hydroxide was added in ten portions, followed by addition of 21.0 g (0.53 mol) of granular sodium hydroxide in two portions. The contents were stirred for one hour at 50° C. The reaction solution was cooled to room temperature, and the produced salts were removed by suction filtration. Subsequently, the filtrate was subjected to evaporation to give a crude product, and epichlorohydrin remaining therein was mostly removed, followed by complete removal of the epichlorohydrin by pressure distillation. Thus, an epoxy ring-containing pyrrolidone compound (hereinafter, also referred to as a monomer (2) or 2Py-ECH(ECH-2Py)) was obtained.

Synthesis Example of Intermediate (1)

Synthesis of (PGM25-ECH-Py1)

A four-necked glass recovery flask reaction vessel equipped with a thermometer, a stirrer, and a nitrogen inlet tube was charged with 28.30 g (25 mmol) of polyethylene glycol monomethyl ether (25) (a compound in which an average of 25 mol of ethylene oxide was added to methanol, hereinafter, also referred to as PGM25) and 0.14 g (2.5 mmol) of potassium hydroxide as a catalyst. The reaction vessel was purged with nitrogen under stirring, the contents were heated to 120° C. in a nitrogen atmosphere, and the temperature was maintained for one hour under atmospheric pressure. Thereafter, the temperature was lowered to 80° C., and while 3.53 g (25 mmol) of the monomer (2) was added to the reaction vessel with a syringe at a rate of 0.1 mL/min, the temperature was maintained for four hours in a nitrogen atmosphere. Thus, a composition containing a pyrrolidone ring- and polyalkylene glycol-containing compound (hereinafter, referred to as an intermediate (1)) was obtained.

Synthesis Example of Intermediate (2)

Synthesis of (lauryl alcohol-ECH-Py1)

A 200-mL four-necked glass recovery flask reaction vessel equipped with a thermometer, a stirrer, and a nitrogen inlet tube was charged with 55.90 g (0.30 mol) of lauryl alcohol and 0.084 g (1.5 mmol) of potassium hydroxide as a catalyst. The reaction vessel was purged with nitrogen under stirring, the contents were heated to 120° C. in a nitrogen atmosphere, and the temperature was maintained for one hour under atmospheric pressure. Thereafter, while 50.82 g (0.36 mol) of the monomer (2) was added to the reaction vessel with a syringe at a rate of 0.2 mL/min, the temperature was maintained for two hours in a nitrogen atmosphere. Thus, a composition containing a pyrrolidone ring- and hydrophobic group-containing compound (hereinafter, referred to as an intermediate (2)) was obtained.

Synthesis Example of Intermediate (3)

Synthesis of (Lauryl Glycidyl Ether-2Py1)

A 500-mL four-necked glass recovery flask reaction vessel equipped with a thermometer, a stirrer, and a nitrogen inlet tube was charged with 153.18 g (1.80 mol) of 2-pyrrolidone and 20.20 g (0.50 mol) of sodium hydroxide as a catalyst. The reaction vessel was purged with nitrogen under stirring, the contents were heated to 80° C. in a nitrogen atmosphere, and the temperature was maintained for one hour under atmospheric pressure. Thereafter, 92.16 g (0.36 mol) of lauryl glycidyl ether was added dropwise to the reaction vessel over one hour with a dropping funnel, and the temperature was maintained for two hours in a nitrogen atmosphere to give a crude reaction product. The crude product was subjected to liquid-liquid separation three times with hexane/saturated saline to remove unreacted 2-pyrrolidone. The organic phase was subjected to evaporation to remove hexane. Thus, a composition containing a pyrrolidone ring- and hydrophobic group-containing compound (hereinafter, referred to as an intermediate (3)) was obtained.

Synthesis Example of Intermediate (4)

Synthesis of (1,2-epoxytetradecane-2py1)

A 500-mL four-necked glass recovery flask reaction vessel equipped with a thermometer, a stirrer, and a nitrogen inlet tube was charged with 188.32 g (2.21 mol) of 2-pyrrolidone and 17.70 g (0.44 mol) of sodium hydroxide as a catalyst. The reaction vessel was purged with nitrogen under stirring, the contents were heated to 80° C. in a nitrogen atmosphere, and the temperature was maintained for one hour under atmospheric pressure. Thereafter, 93.98 g (0.44 mol) of 1,2-epoxytetradecane was added dropwise to the reaction vessel over 45 minutes with a dropping funnel, and the temperature was maintained for four hours in a nitrogen atmosphere to give a crude reaction product. To the crude product was added 1500 ml of pure water, and they were sufficiently stirred and subjected to filtration under reduced pressure to collect a substance on the filter. The substance was washed with pure water five times to remove unreacted 2-pyrrolidone and sodium hydroxide as a catalyst. The substance was heated to 70° C. to be melted, and the residual moisture was removed by evaporation. Thus, a pyrrolidone ring-containing alkylene alcohol compound (hereinafter, referred to as an intermediate (4)) was obtained.

Synthesis Example of Intermediate (5)

Synthesis of (Lauric Acid-ECH-HEP1)

A 200-mL four-necked glass separable flask reaction vessel equipped with a thermometer, a stirrer, and a condenser was charged with 51.96 g (0.26 mol) of lauric acid, and the contents were heated to 120° C. under stirring. Thereafter, 48.04 g (0.26 mol) of the monomer (1) was added dropwise to a reaction vessel over 70 minutes with a syringe pump, and the temperature was maintained for 4.5 hours. Thus, a pyrrolidone ring-containing alkylene alcohol compound (hereinafter, referred to as an intermediate (5)) was obtained.

Synthesis Example of Intermediate (6)

Synthesis of (N-butylbenzylamine-ECH-HEP1)

A 200-mL four-necked glass recovery flask reaction vessel equipped with a thermometer, a stirrer, and a nitrogen inlet tube was charged with 56.22 g (0.34 mol) of N-butyl-benzylamine. The reaction vessel was purged with nitrogen under stirring, the contents were heated to 150° C. in a nitrogen atmosphere, and the temperature was maintained for one hour under atmospheric pressure. Thereafter, while 63.78 g (0.34 mol) of the monomer (1) was added to the reaction vessel at a rate of 0.6 mL/min with a syringe, the temperature was maintained for nine hours in a nitrogen atmosphere. Thus, a composition containing a pyrrolidone ring- and hydrophobic group-containing compound (hereinafter, referred to as an intermediate (6)) was obtained.

Synthesis Example of Intermediate (7)

Synthesis of (cis-3-octen-1-ol-ECH-2py1)

A 300-mL four-necked glass separable flask reaction vessel equipped with a thermometer, a stirrer, and a nitrogen inlet tube was charged with 64.56 g (0.50 mol) of cis-3-octen-1-ol and 0.14 g (2.52 mmol) of potassium hydroxide as a catalyst. The reaction vessel was purged with nitrogen under stirring, the contents were heated to 120° C. in a nitrogen atmosphere, and the temperature was maintained for one hour under atmospheric pressure. Thereafter, the contents were heated to 150° C., 85.30 g (0.60 mol) of the monomer (2) was added to the reaction vessel with a syringe at a rate of 0.8 mL/min, and the temperature was maintained for three hours in a nitrogen atmosphere. Thus, a composition containing a pyrrolidone ring- and polyalkylene glycol-containing compound (hereinafter, referred to as an intermediate (7)) was obtained.

Synthesis Example of Intermediate (8)

Synthesis of (1,2-epoxydecane-2py1)

A 500-mL four-necked glass separable flask reaction vessel equipped with a thermometer, a stirrer, and a nitrogen inlet tube was charged with 205.31 g (2.41 mol) of 2-pyrrolidone and 19.29 g (0.48 mol) of sodium hydroxide as a catalyst. The reaction vessel was purged with nitrogen under stirring, the contents were heated to 80° C. in a nitrogen atmosphere, and the temperature was maintained for one hour under atmospheric pressure. Thereafter, 75.39 g (0.48 mol) of 1,2-epoxydecane was added dropwise to the reaction vessel over one hour with a dropping funnel, and the temperature was maintained for three hours in a nitrogen atmosphere to give a crude reaction product. The crude product was subjected to liquid-liquid separation three times with diethyl ether/saturated saline, followed by single liquid-liquid separation with pure water. Thereby, unreacted 2-pyrrolidone and sodium hydroxide as a catalyst were removed. The organic phase was subjected to evaporation to remove diethyl ether. Thus, a composition containing a pyrrolidone ring- and alkylene glycol-containing compound (hereinafter, referred to as an intermediate (8)) was obtained.

Example 1

A four-necked glass recovery flask reaction vessel equipped with a thermometer, a stirrer, and a nitrogen inlet tube was charged with 12.92 g (100 mmol) of 1-(2-hydroxyethyl)-2-pyrrolidone (HEP) and 2 g (50 mmol) of sodium hydroxide as a catalyst. The reaction vessel was purged with nitrogen under stirring, the contents were heated to 120° C. in a nitrogen atmosphere, and the temperature was maintained for one hour under atmospheric pressure. Thereafter, the temperature was lowered to 80° C., 90.3 g (100 mmol) of DENACOL EX-171 available from NCX (lauryl alcohol (EO)15 glycidyl ether) was added to the reaction vessel in one portion, and the temperature was maintained for seven hours in a nitrogen atmosphere. The reaction solution was cooled to room temperature. Thus, an organic group-terminated polyalkylene glycol-containing compound (hereinafter, referred to as a polyalkylene glycol (1)) was obtained. Another four-necked glass recovery flask reaction vessel equipped with a thermometer, a stirrer, a nitrogen inlet tube, and a condenser was charged with 103.22 g (100 mmol) of the polyalkylene glycol (1). The reaction vessel was purged with nitrogen under stirring, the contents were heated to 120° C. in a nitrogen atmosphere, and the temperature was maintained for one hour under atmospheric pressure. Thereafter, the temperature was lowered to 40° C., 14.19 g (100 mmol) of methyl iodide was added dropwise to the reaction vessel over 30 minutes with a dropping funnel, and the temperature was maintained for seven hours in a nitrogen atmosphere. The reaction solution was cooled to room temperature. Thus, an organic group-terminated polyalkylene glycol-containing compound (1) was obtained.

Example 2

A four-necked glass recovery flask reaction vessel equipped with a thermometer, a stirrer, and a nitrogen inlet tube was charged with 20.00 g of the intermediate (1) and 1.23 g (22 mmol) of potassium hydroxide as a catalyst. The reaction vessel was purged with nitrogen under stirring, the contents were heated to 80° C. in a nitrogen atmosphere, and the temperature was maintained for one hour under atmospheric pressure. Thereafter, 10.26 g (47 mmol) of 1-lauryl chloride was added to the reaction vessel in one portion, and the temperature was maintained for 15 hours in a nitrogen atmosphere. The reaction solution was cooled to room temperature, and ion exchange water was added thereto, followed by sufficient stirring. The resulting dispersion solution was put into a separatory funnel and washed with n-hexane, and the lower phase was drained to collect an aqueous phase. This washing operation was repeated three times. The collected aqueous phase was concentrated by evaporation. The concentrated aqueous solution was placed in a dialysis membrane with a molecular weight cut-off of 1000, the membrane was allowed to stand in an ion exchange water overnight, and from the dialysis membrane was collected an aqueous solution. Thus, a polyalkylene glycol-containing compound (2) was obtained.

Example 3

A 1-L stainless steel autoclave reaction vessel equipped with a thermometer, a stirrer, a material feed tube, and a nitrogen inlet tube was charged with 101.4 g (0.29 mol) of the intermediate (2). The reaction vessel was purged with nitrogen under stirring, and the contents were heated to 130° C. in a nitrogen atmosphere. Thereafter, the pressure in the reaction vessel was reduced to 3.8 kPa with a vacuum pump, and dehydration was performed for one hour under stirring. Then, 312.4 g (7.1 mol) of ethylene oxide was introduced into the reactor over six hours at a safe pressure while the temperature was maintained at 150±5° C., and after the introduction, the temperature was maintained for 30 minutes. Finally, the reaction vessel was purged with nitrogen under stirring, and the contents were cooled to room temperature. Thus, a polyalkylene glycol-containing compound (3) in which an average of 25 mol of ethylene oxide was added to the intermediate (2) was obtained.

Example 4

A 1-L stainless steel autoclave reaction vessel equipped with a thermometer, a stirrer, a material feed tube, and a nitrogen inlet tube was charged with 89.9 g (0.26 mol) of the intermediate (3) and 1.48 (26.4 mmol) of potassium hydroxide as a catalyst. The reaction vessel was purged with nitrogen under stirring, and the contents were heated to 130° C. in a nitrogen atmosphere. Thereafter, the pressure in the reaction vessel was reduced to 2.7 kPa with a vacuum pump, and dehydration was performed for one hour under stirring. Then, 285.0 g (6.5 mol) of ethylene oxide was introduced into the reactor over 12 hours at a safe pressure while the temperature was maintained at 150±5° C., and after the introduction, the temperature was maintained for 30 minutes. Finally, the reaction vessel was purged with nitrogen under stirring, and the contents were cooled to room temperature. Thus, a polyalkylene glycol-containing compound (4) in which an average of 25 mol of ethylene oxide was added to the intermediate (3) was obtained.

Example 5

A 1-L stainless steel autoclave reaction vessel equipped with a thermometer, a stirrer, a material feed tube, and a nitrogen inlet tube was charged with 77.16 g (0.26 mol) of the intermediate (4) and 0.072 g (1.28 mmol) of potassium hydroxide as a catalyst. The reaction vessel was purged with nitrogen under stirring, and the contents were heated to 130° C. in a nitrogen atmosphere. Thereafter, the pressure in the reaction vessel was reduced to 2.7 kPa with a vacuum pump, and dehydration was performed for one hour under stirring. Then, 286.33 g (6.5 mol) of ethylene oxide was introduced into the reactor over five hours at a safe pressure while the temperature was maintained at 150±5° C., and after the introduction, the temperature was maintained for one hour. Finally, the reaction vessel was purged with nitrogen under stirring, and the contents were cooled to room temperature. Thus, a polyalkylene glycol-containing compound (5) in which an average of 25 mol of ethylene oxide was added to the intermediate (4) was obtained.

Example 6

A 1-L stainless steel autoclave reaction vessel equipped with a thermometer, a stirrer, a material feed tube, and a nitrogen inlet tube was charged with 122.3 g (0.09 mol) of the polyalkylene glycol-containing compound (5) and 0.072 g (1.28 mmol) of potassium hydroxide as a catalyst. The reaction vessel was purged with nitrogen under stirring, and the contents were heated to 130° C. in a nitrogen atmosphere. Thereafter, the pressure in the reaction vessel was reduced to 2.7 kPa with a vacuum pump, and dehydration was performed for one hour under stirring. Then, 57.8 g (1.31 mol) of ethylene oxide was introduced into the reactor over one hour at a safe pressure while the temperature was maintained at 150±5° C., and after the introduction, the temperature was maintained for one hour. Finally, the reaction vessel was purged with nitrogen under stirring, and the contents were cooled to room temperature. Thus, a polyalkylene glycol-containing compound (6) in which an average of 40 mol of ethylene oxide was added to the intermediate (4) was obtained.

Example 7

A 1-L stainless steel autoclave reaction vessel equipped with a thermometer, a stirrer, a material feed tube, and a nitrogen inlet tube was charged with 126.1 g (0.06 mol) of the polyalkylene glycol-containing compound (6) and 0.042 g (0.75 mmol) of potassium hydroxide as a catalyst. The reaction vessel was purged with nitrogen under stirring, and the contents were heated to 130° C. in a nitrogen atmosphere. Thereafter, the pressure in the reaction vessel was reduced to 2.7 kPa with a vacuum pump, and dehydration was performed for one hour under stirring. Then, 53.9 g (1.22 mol) of ethylene oxide was introduced into the reactor over one hour at a safe pressure while the temperature was maintained at 150±5° C., and after the introduction, the temperature was maintained for one hour. Finally, the reaction vessel was purged with nitrogen under stirring, and the contents were cooled to room temperature. Thus, a polyalkylene glycol-containing compound (7) in which an average of 60 mol of ethylene oxide was added to the intermediate (4) was obtained.

Example 8

A 1-L stainless steel autoclave reaction vessel equipped with a thermometer, a stirrer, a material feed tube, and a nitrogen inlet tube was charged with 77.16 g (0.26 mol) of the intermediate (4) and 0.072 g (1.28 mmol) of potassium hydroxide as a catalyst. The reaction vessel was purged with nitrogen under stirring, and the contents were heated to 130° C. in a nitrogen atmosphere. Thereafter, the pressure in the reaction vessel was reduced to 2.7 kPa with a vacuum pump, and dehydration was performed for one hour under stirring. Then, 102.88 g (2.3 mol) of ethylene oxide was introduced into the reactor over two hours at a safe pressure while the temperature was maintained at 150±5° C., and after the introduction, the temperature was maintained for one hour. Finally, the reaction vessel was purged with nitrogen under stirring, and the contents were cooled to room temperature. Thus, a polyalkylene glycol-containing compound (8) in which an average of 9 mol of ethylene oxide was added to the intermediate (4) was obtained.

Example 9

A 1-L stainless steel autoclave reaction vessel equipped with a thermometer, a stirrer, a material feed tube, and a nitrogen inlet tube was charged with 88.74 g (0.23 mol) of the intermediate (5) and 0.18 g (3.2 mmol) of potassium hydroxide as a catalyst. The reaction vessel was purged with nitrogen under stirring, and the contents were heated to 130° C. in a nitrogen atmosphere. Thereafter, the pressure in the reaction vessel was reduced to 2.7 kPa with a vacuum pump, and dehydration was performed for one hour under stirring.

Then, 91.18 g (2.07 mol) of ethylene oxide was introduced into the reactor over three hours at a safe pressure while the temperature was maintained at 150±5° C., and after the introduction, the temperature was maintained for one hour. Finally, the reaction vessel was purged with nitrogen under stirring, and the contents were cooled to room temperature. Thus, a polyalkylene glycol-containing compound (9) in which an average of 9 mol of ethylene oxide was added to the intermediate (5) was obtained.

Example 10

A 1-L stainless steel autoclave reaction vessel equipped with a thermometer, a stirrer, a material feed tube, and a nitrogen inlet tube was charged with 72.81 g (0.09 mol) of the polyalkylene glycol-containing compound (9) and 0.071 g (1.27 mmol) of potassium hydroxide as a catalyst. The reaction vessel was purged with nitrogen under stirring, and the contents were heated to 130° C. in a nitrogen atmosphere. Thereafter, the pressure in the reaction vessel was reduced to 2.7 kPa with a vacuum pump, and dehydration was performed for one hour under stirring. Then, 82.02 g (1.86 mol) of ethylene oxide was introduced into the reactor over one hour at a safe pressure while the temperature was maintained at 150±5° C., and after the introduction, the temperature was maintained for one hour. Finally, the reaction vessel was purged with nitrogen under stirring, and the contents were cooled to room temperature. Thus, a polyalkylene glycol-containing compound (10) in which an average of 29 mol of ethylene oxide was added to the intermediate (5) was obtained.

Example 11

A 1-L stainless steel autoclave reaction vessel equipped with a thermometer, a stirrer, a material feed tube, and a nitrogen inlet tube was charged with 84.13 g (0.24 mol) of the intermediate (6) and 0.19 g (3.39 mmol) of potassium hydroxide as a catalyst. The reaction vessel was purged with nitrogen under stirring, and the contents were heated to 130° C. in a nitrogen atmosphere. Thereafter, the pressure in the reaction vessel was reduced to 2.7 kPa with a vacuum pump, and dehydration was performed for one hour under stirring. Then, 265.87 g (6.04 mol) of ethylene oxide was introduced into the reactor over five hours at a safe pressure while the temperature was maintained at 150±5° C., and after the introduction, the temperature was maintained for one hour. Finally, the reaction vessel was purged with nitrogen under stirring, and the contents were cooled to room temperature. Thus, a polyalkylene glycol-containing compound (11) in which an average of 25 mol of ethylene oxide was added to the intermediate (6) was obtained.

Example 12

A 1-L stainless steel autoclave reaction vessel equipped with a thermometer, a stirrer, a material feed tube, and a nitrogen inlet tube was charged with 93.16 g (0.31 mol) of the intermediate (7). The reaction vessel was purged with nitrogen under stirring, and the contents were heated to 130° C. in a nitrogen atmosphere. Thereafter, the pressure in the reaction vessel was reduced to 2.7 kPa with a vacuum pump, and dehydration was performed for one hour under stirring. Then, 206.8 g (4.7 mol) of ethylene oxide was introduced into the reactor over four hours at a safe pressure while the temperature was maintained at 150±5° C., and after the introduction, the temperature was maintained for 30 minutes. Finally, the reaction vessel was purged with nitrogen under stirring, and the contents were cooled to room temperature. Thus, a polyalkylene glycol-containing compound (12) in which an average of 15 mol of ethylene oxide was added to the intermediate (7) was obtained.

Example 13

A 1-L stainless steel autoclave reaction vessel equipped with a thermometer, a stirrer, a material feed tube, and a nitrogen inlet tube was charged with 80.27 g (0.33 mol) of the intermediate (8) and 0.09 g (1.60 mmol) of potassium hydroxide as a catalyst. The reaction vessel was purged with nitrogen under stirring, and the contents were heated to 130° C. in a nitrogen atmosphere. Thereafter, the pressure in the reaction vessel was reduced to 2.7 kPa with a vacuum pump, and dehydration was performed for one hour under stirring. Then, 219.7 g (5.0 mol) of ethylene oxide was introduced into the reactor over four hours at a safe pressure while the temperature was maintained at 150±5° C., and after the introduction, the temperature was maintained for 30 minutes. Finally, the reaction vessel was purged with nitrogen under stirring, and the contents were cooled to room temperature. Thus, a polyalkylene glycol-containing compound (13) in which an average of 15 mol of ethylene oxide was added to the intermediate (8) was obtained.

<Comparative Example 1> Synthesis of PVP

A glass separable flask equipped with a thermometer, a reflux condenser, and a stirrer was charged with 119.72 g of pure water, and the contents were heated to 80° C. under stirring (initial charge). Subsequently, under stirring, a solution mixture (solution A) of 0.283 g of a 0.025% aqueous copper sulfate solution and 90.0 g of N-vinylpyrrolidone, 45.0 g of a 2% by mass aqueous ammonium persulfate solution (solution B), and 45.0 g of an aqueous solution mixture (solution C) containing an aqueous sodium bisulfite solution and sodium sulfite each in a proportion of 5% were added dropwise to a polymerization reaction system at a constant temperature of 80° C. through different dripping nozzles. The solution was added dropwise over 60 minutes, the solution B was added dropwise over 120 minutes (36.0 g was added dropwise in the former 60 minutes, and 9.0 g was added dropwise in the latter 60 minutes), and the solution C was added dropwise over 120 minutes (36.0 g was added dropwise in the former 60 minutes, and 9.0 g was added dropwise in the latter 60 minutes). All the solutions were started dropping at the same time. After completion of dropwise addition of all the solutions, the reaction solution was aged at a temperature of 80° C. for 30 minutes to complete the polymerization. Thus, a polyvinylpyrrolidone homopolymer (hereinafter, also referred to as PVP) having a weight average molecular weight (hereinafter, also referred to as Mw) of 4700 was obtained.

As for the polyalkylene glycol-containing compound (PAG compound) (1) obtained in Example 1, the carbon number and the type of the hydrocarbon group of $R^1$ in the formula (1'), the structures of $X^{1a}$ and $R^4$, n1, w1, and a combination (x, y, z) in the formula (4) are shown in Table 1.

As for the polyalkylene glycol-containing compounds (PAG compounds) (2) to (13) obtained in Examples 2 to 13, the carbon number and the type of the hydrocarbon group of $R^5$ in the formula (2); the structures of $X^2$, $X^3$, and $R^8$; n2;

w2; and a combination (x, y, z) in the formula (4) (in the formula (4') as for the PAG compounds (9) and (10)) are shown in Table 2.

The polyalkylene glycol-containing compounds (2) to (11) obtained in Examples 2 to 11, PVP obtained in Comparative Example 1, and SOFTANOL 90 (available from Nippon Shokubai Co., Ltd., hereinafter, also referred to as SFT90) as Comparative Example 2 were subjected to testing of the above-described detergency evaluation 1 for composite stains. The polyalkylene glycol-containing compounds (2), (5) to (7), (10), and (11) obtained in Examples 2, 5 to 7, 10, and 11 and PVP and SFT90 were subjected to the measurement of interfacial tension between oleic acid and water.

Further, the PAG compounds (5) and (10) obtained in Examples 5 and 10 were subjected to testing of the above-described detergency evaluation 3 and biodegradation test, and the aniline as Comparative Example 3 was subjected to the biodegradation test.

The results are shown in Table 3.

TABLE 1

| | | In formula (1') | | | | |
| --- | --- | --- | --- | --- | --- | --- |
| | Polyalkylene glycol-containing compound | Carbon number of $R^1$ (type of hydrocarbon group) | $X^{1a}$ | n1 | $R^4$ | w1 | (x, y, z) in formula (4) |
| Example 1 | (1) | 12 (Linear alkyl) | — | 15 | $CH_3$ | 1 | (1, 1, 1) |

TABLE 2

| | | In formula (2) | | | | | | |
| --- | --- | --- | --- | --- | --- | --- | --- | --- |
| | Polyalkylene glycol-containing compound | Carbon number of $R^5$ (type of hydrocarbon group) | $X^2$ | $X^3$ | n2 | $R^8$ | w2 | (x, y, z) in formula (4) or (4') |
| Example 2 | (2) | 12 (Linear alkyl) | O | O | 25 | $CH_3$ | 1 | (1, 0, 1) |
| Example 3 | (3) | 12 (Linear alkyl) | O | O | 25 | H | 1 | (1, 0, 1) |
| Example 4 | (4) | 12 (Linear alkyl) | O | O | 25 | H | 1 | (1, 0, 1) |
| Example 5 | (5) | 12 (Linear alkyl) | — | O | 25 | H | 1 | (1, 0, 1) |
| Example 6 | (6) | 12 (Linear alkyl) | — | O | 40 | H | 1 | (1, 0, 1) |
| Example 7 | (7) | 12 (Linear alkyl) | — | O | 60 | H | 1 | (1, 0, 1) |
| Example 8 | (8) | 12 (Linear alkyl) | — | O | 9 | H | 1 | (1, 0, 1) |
| Example 9 | (9) | 11 (Linear alkyl) | COO | O | 9 | H | 1 | (1, 1, 1) |
| Example 10 | (10) | 11 (Linear alkyl) | COO | O | 25 | H | 1 | (1, 1, 1) |
| Example 11 | (11) | 11 (Amino alkyl aryl) | — | O | 25 | H | 1 | (1, 1, 1) |
| Example 12 | (12) | 8 (Linear alkenyl) | O | O | 15 | H | 1 | (1, 0, 1) |
| Example 13 | (13) | 8 (Linear alkyl) | — | O | 15 | H | 1 | (1, 0, 1) |

TABLE 3

| | Compound | Interfacial tension (No polymer: 3.8) | Detergency for composite stains (usual conditions) (No polymer: 9.5) | Biodegradation rate in biodegradation test |
| --- | --- | --- | --- | --- |
| Example 2 | PAG compound (2) | 2.4 | 43.9 | — |
| Example 3 | PAG compound (3) | — | 56.6 | — |
| Example 4 | PAG compound (4) | — | 38.0 | — |
| Example 5 | PAG compound (5) | 2.4 | 38.7 | 65.5% |
| Example 6 | PAG compound (6) | 2.6 | 36.6 | — |
| Example 7 | PAG compound (7) | 2.7 | 36.5 | — |
| Example 8 | PAG compound (8) | — | 38.9 | — |
| Example 9 | PAG compound (9) | — | 35.1 | — |
| Example 10 | PAG compound (10) | 2.9 | 38.6 | 68.8% |
| Example 11 | PAG compound (11) | 2.2 | 32.0 | — |
| Comparative Example 1 | PVP | 3.6 | 15.8 | — |
| Comparative Example 2 | SFT90 | 4.2 | 21.2 | — |
| Comparative Example 3 | Aniline | — | — | 50.0% |

The invention claimed is:

1. A polyalkylene glycol-containing compound comprising:

a hydrophobic structural moiety (A);
a polyalkylene glycol moiety (B); and
one lactam ring-containing structural unit (C), in its structure,
wherein the polyalkylene glycol-containing compound is represented by the following formula (2):

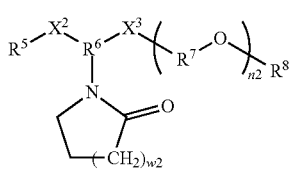

(2)

wherein $R^5$ is a hydrocarbon group having a carbon number of 4 or greater and optionally containing at least one heteroatom; $R^8$ is a hydrogen atom or a hydrocarbon group having a carbon number smaller than that of $R^5$ and optionally containing at least one heteroatom; $R^6$ is a structure represented by the following formula (4) or (4');

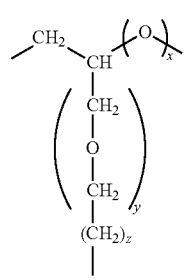

(4)

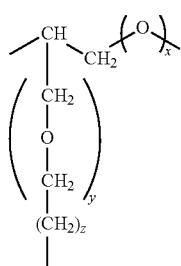

(4')

wherein x is 0, y is 0 or 1, and z is a number of 0 to 5; $R^7$s are the same as or different from each other and are each a C2-C20 alkylene group; $X^2$ is direct bond, an ester group, an ether group, a carbonyl group, a carbonate group, or a group represented by the following formula (10):

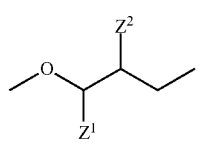

(10)

wherein $Z^1$ and $Z^2$ are each a hydrogen atom or hydroxy group, with one of $Z^1$ or $Z^2$ being a hydrogen atom and the other being a hydroxy group; $X^3$ is a urethane group, an ester group, an ether group, a carbonyl group, a carbonate group, an isocyanate group or an amide group; n2 is a number of 5 to 100; and w2 is a number of 1 to 3,
wherein the at least one heteroatom in each of $R^5$ and $R^8$ is a nitrogen atom, a sulfur atom, a phosphorus atom, or a halogen atom,
a proportion of a total mass of $R^8$ other than a hydrogen atom and $R^5$ is 2.5 to 60% by mass in 100% by mass of the polyalkylene glycol-containing compound.

2. The polyalkylene glycol-containing compound according to claim 1,
wherein the lactam ring is a pyrrolidone ring.

3. The polyalkylene glycol-containing compound according to claim 1,
wherein the polyalkylene glycol-containing compound contains the hydrophobic structural moiety (A), the lactam ring-containing structural unit (C), and the polyalkylene glycol moiety (B) in the stated order.

4. The polyalkylene glycol-containing compound according to claim 1,
wherein the polyalkylene glycol-containing compound contains the hydrophobic structural moiety (A), the polyalkylene glycol moiety (B), and the lactam ring-containing structural unit (C) in the stated order.

5. The polyalkylene glycol-containing compound according to claim 1,
wherein the polyalkylene glycol-containing compound contains hydrophobic groups at an end of a polyalkylene glycol chain and an end other than the end of a polyalkylene glycol chain.

6. The polyalkylene glycol-containing compound according to claim 1,
wherein the hydrophobic structural moiety (A) is a structure derived from at least one selected from the group consisting of an acyclic hydrocarbon compound, a cyclic saturated hydrocarbon compound, and an aromatic compound each optionally containing a heteroatom.

7. The polyalkylene glycol-containing compound according to claim 1,
wherein $R^5$ is at least one selected from the group consisting of a C4-C50 aliphatic alkyl group, a C4-C50 alicyclic alkyl group, a C4-C50 alkenyl group, a C4-C50 alkynyl group, and a C6-C50 aryl group each optionally containing a heteroatom.

8. The polyalkylene glycol-containing compound according to claim 1,
wherein $R^8$ is a C1-C3 alkyl group or a hydrogen atom.

9. The polyalkylene glycol-containing compound according to claim 1,
wherein n2 is 5 to 80.

10. The polyalkylene glycol-containing compound according to claim 1,
wherein the lactam ring containing structural unit (C) is present in a proportion of 1 to 50% by mass in 100% by mass of the polyalkylene glycol-containing compound.

11. The polyalkylene glycol-containing compound according to claim 1,
wherein the polyalkylene glycol moiety (B) is present in a proportion of 5 to 95% by mass in 100% by mass of the polyalkylene glycol-containing compound.

12. The polyalkylene glycol-containing compound according to claim 1,
wherein the polyalkylene glycol-containing compound has a number average molecular weight of 500 to 100000.

13. A method of producing the polyalkylene glycol-containing compound according to claim 1, the method comprising any one of the following (i) to (iii):

(i) reacting a compound represented by the following formula (11):

wherein $R^{13}$ is a hydrogen atom or a C2-C10 organic group containing a reactive functional group and w3 is a number of 1 to 3, with a compound represented by the following formula (15):

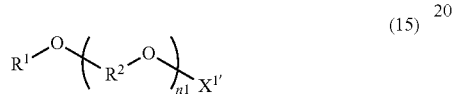

wherein $R^1$ is at least one selected from the group consisting of aliphatic alkyl groups having 4 to 50 carbon atoms, cycloaliphatic alkyl groups having 4 to 50 carbon atoms, alkenyl alkynyl groups having 4 to 50 carbon atoms, alkynyl groups having 4 to 50 carbon atoms, and aryl groups having 6 to 50 carbon atoms, which optionally have at least one heteroatom; $R^2$s are the same as or different from each other and are each a C2-C20 alkylene group; and $X^{1'}$ is a hydrogen atom or a C1-C10 organic group containing a reactive functional group, wherein the at least one heteroatom in $R^1$ is a nitrogen atom, a sulfur atom, a phosphorus atom, or a halogen atom; n1 is a number of 5 to 100;

(ii) a first step of reacting a compound represented by the above formula (11) with a compound represented by the following formula (18):

$$X^{3'}-(R^7O)n2-R^{8'} \quad (18)$$

wherein $R^{8'}$ is a hydrogen atom or a hydrocarbon group optionally containing at least one heteroatom and having a carbon number smaller than that of $R^5$ in the formula (2); $R^7$s are the same as or different from each other and are each a C2-C20 alkylene group; $X^{3'}$ is a hydrogen atom or a reactive functional group; and n2 are the same as or different from each other and is a number of 5 to 100, wherein the at least one heteroatom in $R^8$ is a nitrogen atom, a sulfur atom, a phosphorus atom, or a halogen atom;

and a second step of reacting the resulting reaction product in the first step with a compound represented by the following formula (19):

$$R^1-X^{2'} \quad (19)$$

wherein $R^1$ is at least one selected from the group consisting of aliphatic alkyl groups having 4 to 50 carbon atoms, cycloaliphatic alkyl groups having 4 to 50 carbon atoms, alkenyl groups having 4 to 50 carbon atoms, alkynyl groups having 4 to 50 carbon atoms, and aryl groups having 6 to 50 carbon atoms, which optionally have at least one heteroatom and $X^{2'}$ is a reactive functional group, wherein the at least one heteroatom in $R^1$ is a nitrogen atom, a sulfur atom, a phosphorus atom, or a halogen atom; and (iii) a first step of reacting a compound represented by the above formula (19) with a compound represented by the above formula (11) and a second step of reacting the reaction product obtained in the first step with an alkylene oxide.

14. A composition comprising:
the polyalkylene glycol-containing compound according to claim 1; and
a different component other than the polyalkylene glycol-containing compound,
the polyalkylene glycol-containing compound being present in a proportion of 1 to 99% by mass in 100% by mass of the composition.

15. A detergent composition comprising:
the polyalkylene glycol-containing compound according to claim 1; and
a detergent additive other than the polyalkylene glycol-containing compound.

16. A detergent composition comprising:
the polyalkylene glycol-containing compound according to claim 1; and
a surfactant.

* * * * *